(12) United States Patent
Mang et al.

(10) Patent No.: US 12,279,002 B2
(45) Date of Patent: Apr. 15, 2025

(54) METHOD AND SYSTEM FOR QUANTIFYING EFFECTS OF A CONTENT DELIVERY NETWORK SERVER ON STREAMING-MEDIA QUALITY AND PREDICTING ROOT CAUSE ANALYSIS

(71) Applicant: AT&T Intellectual Property I, L.P., Atlanta, GA (US)

(72) Inventors: Xiaowen Mang, Morganville, NJ (US); Carolyn Roche Johnson, Holmdel, NJ (US); Gregory J. Smith, Shrewsbury, NJ (US); Peni-Taito Payne, Katy, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 171 days.

(21) Appl. No.: 17/736,457

(22) Filed: May 4, 2022

(65) Prior Publication Data
US 2023/0362420 A1 Nov. 9, 2023

(51) Int. Cl.
*H04N 21/24* (2011.01)
*H04N 21/442* (2011.01)
*H04N 21/466* (2011.01)

(52) U.S. Cl.
CPC ..... *H04N 21/2402* (2013.01); *H04N 21/2404* (2013.01); *H04N 21/44204* (2013.01); *H04N 21/4666* (2013.01)

(58) Field of Classification Search
CPC .......... H04N 21/2402; H04N 21/2404; H04N 21/44204; H04N 21/4666
See application file for complete search history.

(56) References Cited

U.S. PATENT DOCUMENTS

| | | | |
|---|---|---|---|
| 11,089,076 B1 * | 8/2021 | Thario | H04L 65/612 |
| 2019/0222491 A1 * | 7/2019 | Tomkins | H04L 41/0823 |
| 2020/0401936 A1 * | 12/2020 | Embarmannar Vijayan | G06N 20/00 |
| 2021/0176530 A1 * | 6/2021 | Lobanov | H04L 67/02 |
| 2021/0410029 A1 * | 12/2021 | Farag | H04W 36/023 |
| 2022/0036259 A1 * | 2/2022 | Bird | G06Q 10/04 |

* cited by examiner

*Primary Examiner* — John W Miller
*Assistant Examiner* — Akshay Doshi
(74) *Attorney, Agent, or Firm* — GUNTIN & GUST, PLC; Dana B. Lemoine

(57) ABSTRACT

Aspects of the subject disclosure may include, for example, identifying a threshold value of a streaming-media key performance indicator (KPI) based on a predetermined target portion of end-user devices that provide an acceptable performance. Performance records are obtained for a content delivery network (CDN) adapted to cache and serve media content requested by the end-user devices. Predicted values of the streaming-media KPI are generated according to the performance records of the CDN and compared to the threshold value of the streaming-media KPI to obtain a comparison. An anomaly is detected according to the comparison, to indicate that a predetermined number of the predicted values of the streaming-media KPI fail to satisfy the threshold value. Other embodiments are disclosed.

20 Claims, 13 Drawing Sheets

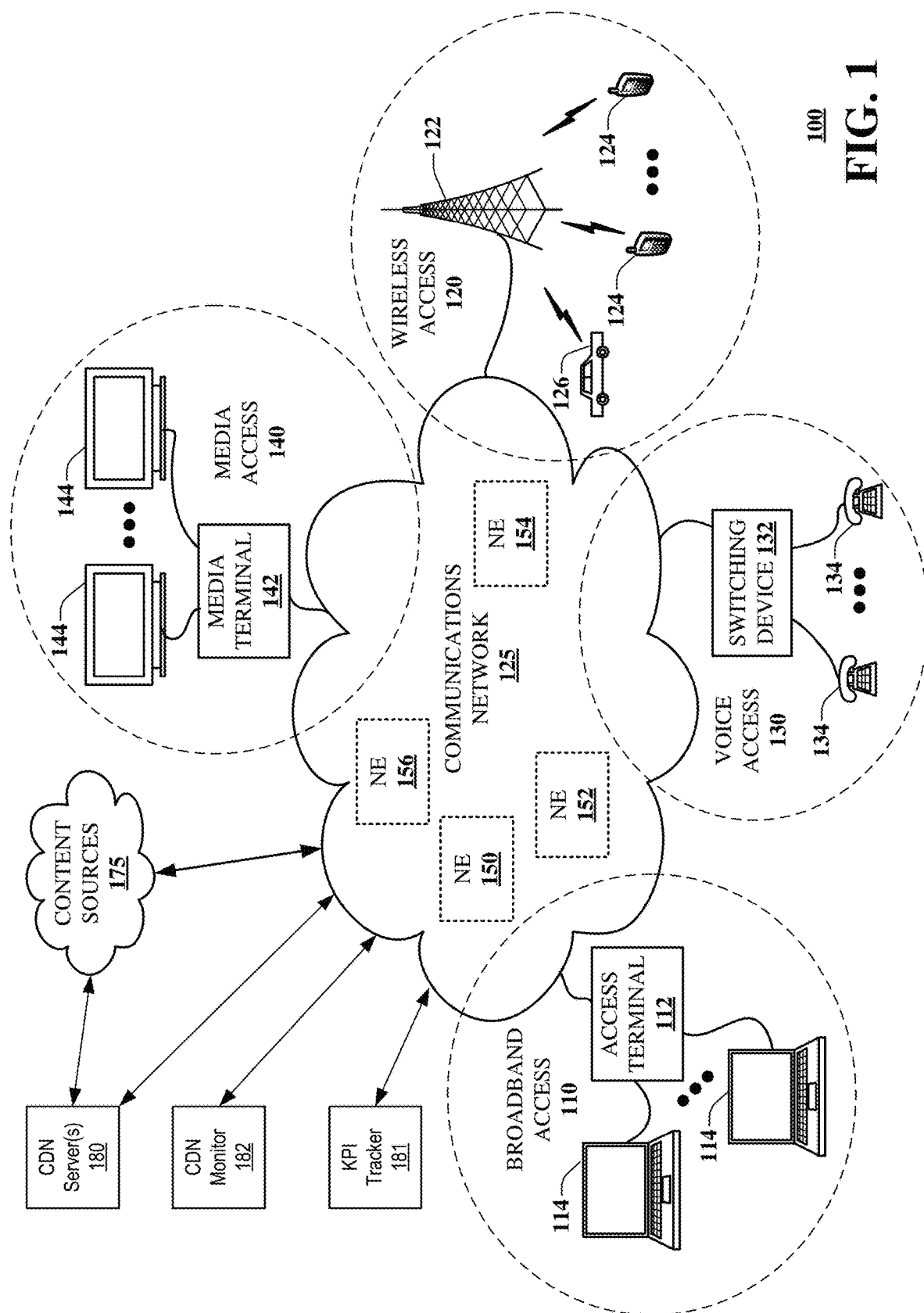

METHOD AND SYSTEM FOR QUANTIFYING EFFECTS OF A CONTENT DELIVERY NETWORK SERVER ON STREAMING-MEDIA QUALITY AND PREDICTING ROOT CAUSE ANALYSIS

FIELD OF THE DISCLOSURE

The subject disclosure relates to a method and system for quantifying effects of a content delivery network server on streaming-media quality and predicting root cause analysis.

BACKGROUND

A content distribution network (CDN) allows content providers to use a widely distributed network of live streaming servers for their content. Typically, viewers who request content from a CDN are automatically routed to a closest server. Essentially, a live streaming CDN makes streaming go more smoothly for all viewers. A top-tier CDN maximizes the quality of live video streaming.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

DETAILED DESCRIPTION

Figure 2A:
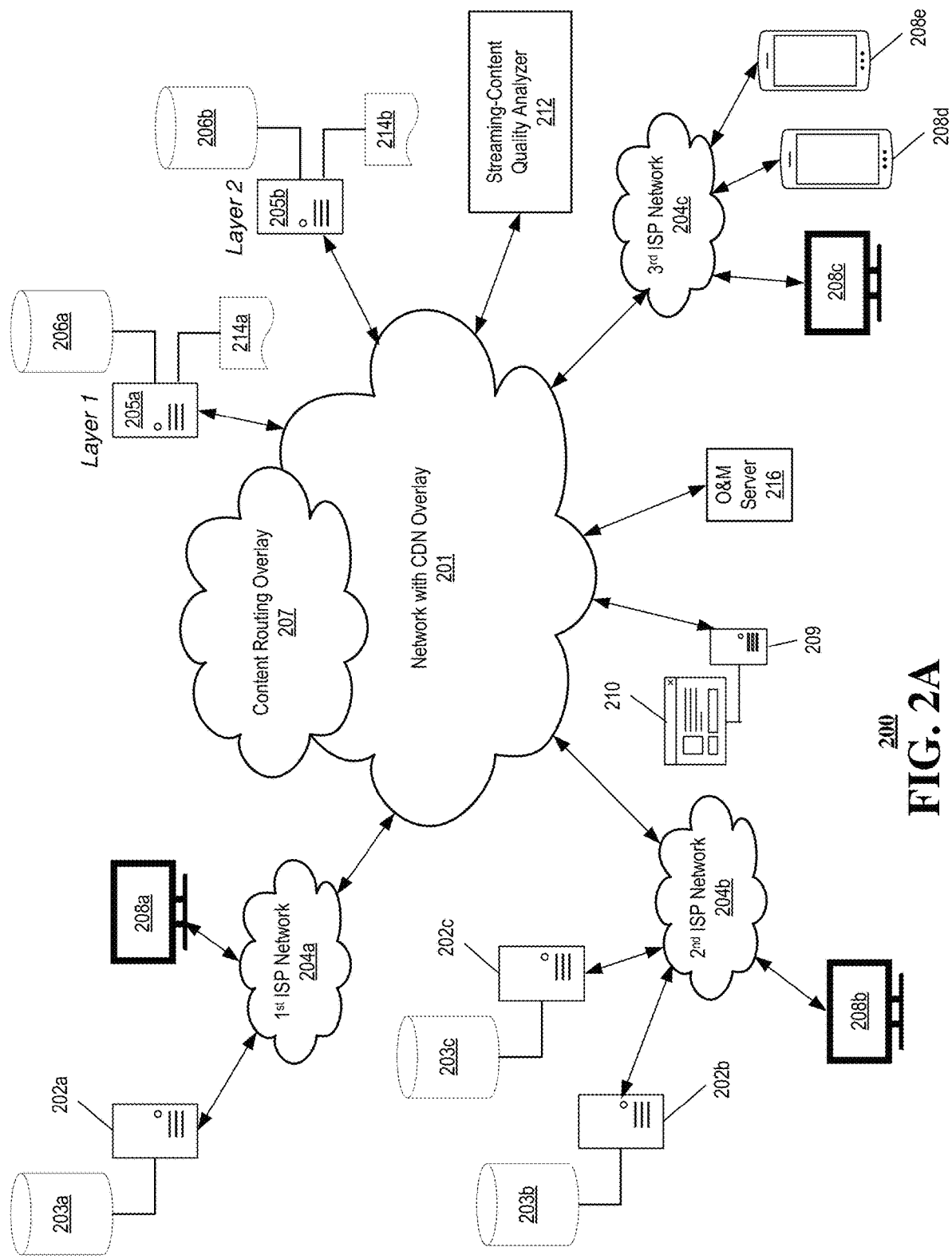
FIG. 2A is a block diagram illustrating an example, non-limiting embodiment of a live streaming content delivery system functioning within the communication network of FIG. 1 in accordance with various aspects described herein.

The subject disclosure describes, among other things, illustrative embodiments for automatically predicting key performance indicator (KPI) values to anticipate likely content delivery network (CDN) performance issues that would impact streaming media quality and to identify their most likely root causes. The information may be shared with the appropriate CDN and/or service provider(s), allowing them to proactively address performance issues to avoid many end user performance issues. Prediction of the KPI(s) may be accomplished by automatically establishing a streaming-media threshold that corresponds to a satisfactory end-user quality, for applying the threshold to identify anomalous conditions, and for localizing a likely source as may be attributable, e.g., to content providers, Internet service providers (ISP), content caching servers. In at least some embodiments, an evaluation of KPI value predictions may be used for identifying a growth requirement for content caching capacity. Other embodiments are described in the subject disclosure.

One or more aspects of the subject disclosure include a process that calculates, by a processing system including a processor, a threshold value of a streaming-media KPI based on a level of certainty that a predetermined target portion of a number of end-user media processors provide an acceptable end-user experience. Access records are obtained, by the processing system, of a CDN configured to serve media content requested by the end-user media processors, and a number of values of the streaming-media KPI are predicted, by the processing system, according to the access records of the CDN, to obtain a number of predicted values of the streaming-media KPI. The number of predicted values of the streaming-media KPI are compared, by the processing system, to the threshold value of the streaming-media KPI to obtain a comparison, and an anomaly is identified, by the processing system, according to the comparison, wherein the anomaly indicates a predetermined number of the predicted values of the streaming-media KPI fail to satisfy the threshold value of the streaming-media KPI.

One or more aspects of the subject disclosure include a device, that includes a processing system including a processor and a memory that stores executable instructions that, when executed by the processing system, facilitate performance of operations. The operations include determining a threshold value of a streaming-media KPI based on a predetermined target portion of a number of end-user devices providing an acceptable performance. Performance records are obtained of a CDN adapted to cache and serve media content requested by the end-user devices. A number of values of the streaming-media KPI are predicted according to the performance records of the CDN, to obtain predicted values of the streaming-media KPI. The predicted values of the streaming-media KPI are compared to the threshold value of the streaming-media KPI to obtain a comparison and an anomaly is identified according to the comparison, wherein the anomaly indicates a predetermined number of the predicted values of the streaming-media KPI fail to satisfy the threshold value of the streaming-media KPI.

One or more aspects of the subject disclosure include a non-transitory, machine-readable medium, including executable instructions that, when executed by a processing system including a processor, facilitate performance of operations. The operations include identifying a threshold value of a streaming-media KPI based on a predetermined target portion of end-user devices providing an acceptable performance, and obtaining performance records of a CDN adapted to cache and serve media content requested by the end-user devices. A number of predicted values of the streaming-media KPI are generated according to the performance records of the CDN, to obtain predicted values of the streaming-media KPI. The predicted values of the streaming-media KPI are compared to the threshold value of the streaming-media KPI to obtain a comparison and an anomaly is detected according to the comparison, wherein the anomaly indicates a predetermined number of the predicted values of the streaming-media KPI fail to satisfy the threshold value of the streaming-media KPI.

One or more aspects of the subject disclosure include a process that includes identifying, by a processing system including a processor, a media caching server of a content delivery system, and associating, by the processing system, a time series of streaming-media KPI values with the media caching server. The KPI values are reported by a number of streaming-media consumption devices responsive to delivery of streaming-media content via the media caching server of the content delivery system. A predetermined target portion of the number of streaming-media consumption devices is identified, by the processing system, to deliver, via the content delivery system, a streaming-media consumption experience according to a predetermined quality. A time series of a target threshold streaming-media KPI values is identified, by the processing system, according to which the predetermined target portion of the plurality of streaming-media consumption devices report respective streaming-media KPI values, and an average value of the time series of the target threshold streaming-media KPI values is calculated, by the processing system, to obtain an upper threshold value.

One or more aspects of the subject disclosure include a device, that includes a processing system including a processor and a memory that stores executable instructions that, when executed by the processing system, facilitate performance of operations. The operations include obtaining a number of streaming-media KPI values reported by a number of streaming-media consumption devices responsive to delivery of streaming-media content during an observation period via a content delivery system. A predetermined target portion of the number of streaming-media consumption devices is identified to deliver, via the content delivery system, a streaming-media consumption experience according to a predetermined quality. A number of target threshold streaming-media KPI values is identified within the observation period according to which the predetermined target portion of the plurality of streaming-media consumption devices report streaming-media KPI values, and an average value of the number of target threshold streaming-media KPI values is determined to obtain an upper threshold value.

One or more aspects of the subject disclosure include a non-transitory, machine-readable medium, including executable instructions that, when executed by a processing system including a processor, facilitate performance of operations. The operations include accessing a number of streaming-media KPI values corresponding to streaming-media content delivered to a number of streaming-media consumption devices during an observation period via a content delivery system. A portion of the number of streaming-media consumption devices is identified towards which streaming-media content is delivered via the content delivery system according to a predetermined quality. A number of target threshold streaming-media KPI values is identified within the observation period according to which the portion of the plurality of streaming-media consumption devices report streaming-media KPI values, and an average value of the number of target threshold streaming-media KPI values is determined to obtain an upper threshold value.

The subject disclosure is directed to determining whether a particular segment, subsystem, or component of a streaming content delivery system, such as CDN content servers, are a root causes for viewing quality degradation as may be perceived by content-requesting, end user devices. The examples provided below facilitate design and/or engineering of one or more video quality targets, together with systems and processes adapted to detect effects of CDN cache server performance on video qualities that viewers will experience. The techniques disclosed herein, as they related to video quality target engineering, are generally data driven, taking into consideration industrial acceptable standards, and introducing a leeway adapted to absorb embedded variations. For example, two types of targets may be defined: one that indicates a need for capacity re-evaluation, which involves both Internet Service Providers (ISP) and CDN providers; and another that detects anomalous conditions, which may be used to trigger troubleshooting process for mitigation.

The techniques disclosed herein are also adapted to correlate cache server performance and video quality in a data driven approach to provide actionable insights on mitigation plans for CDN providers. Some CDN management services may focus on managing catching servers, or optimizing the content catching server placements, or monitoring video quality KPIs. In these applications, troubleshooting exercises to identify any root cause analysis would be conducted in an offline fashion. As described herein, the monitoring and/or analyses techniques may apply real-time and/or near real time log analyzers that may be adapted to generate alerts automatically. Beneficially, the techniques disclosed herein facilitate an automated correlation of events from different monitoring systems that would otherwise involve significant human power, with expert level domain knowledge. The automated techniques disclosed herein offer opportunities to offset operation cost for all service providers.

Referring now to FIG. 1, a block diagram is shown illustrating an example, non-limiting embodiment of a system 100 in accordance with various aspects described herein. For example, the system 100 can facilitate in whole or in part, an automated identification of a streaming-media KPI threshold that corresponds to a satisfactory end-user quality. The identification process may include associating a time series of KPI values with a CDN subsystem, such as a live-streaming caching server, in which the KPI values may correspond to a number of streaming media consumption devices served by the CDN subsystem. In at least some embodiments, a time series of KPI values may be obtained, e.g., from a centralized KPI monitoring service. Alternatively or in addition, the KPI values may be estimated according to access logs obtained from the CDN subsystem. The KPI value estimation process may apply machine learning, e.g., a process that involves training an artificial intelligence (AI) module based on previously recorded training data. In at least some embodiments, the thresholds may be applied, e.g., in combination with CDN subsystem, access log information, to identify anomalous conditions that may be attributable to content caching servers, and/or for identifying a growth requirement for content caching capacity.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content, including streaming media content, via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content, including streaming media content, from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets, or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway, or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments, the system 100 includes one or more CDN servers 180. The CDN servers 180 may include one or more streaming-content caching servers as may be strategically distributed within the system 100 to facilitate large numbers of requests for similar and/or the same content items. The distributed CDN servers 180 store at least portions of popular content, serving at least a portion of those requests without requiring them to be served by the content sources 175. The example system 100 also includes a CDN monitor 182 and a KPI tracker 181, e.g., as a quality metrics tracking system or service. The KPI tracker 181 may monitor, request and/or otherwise collect and record metrics associated with a quality of streaming-content deliveries by the system 100. In at least some examples, the quality metrics include video quality metrics as may be represented by one or more of the example KPI disclosed herein and/or otherwise known to those skilled in the art. The KPI data may be provided to the CDN monitor 182, which may also be adapted to acquire access log records from one or more segments and/or subsystems of the system 100 adapted to participate in live-streaming and/or on-demand streaming delivery of content.

The CDN monitor 182 may be adapted to monitor quality performance of such live-streaming content and/or on-demand streaming delivery to evaluate performance against business goals in a real time or near real time manner, such that any performance issues may be identified and addressed proactively before they result in end user issues, to ensure that end users receive a measured assurance of a satisfactory experience. In at least some embodiments, the CDN monitoring may occur in real time and/or near real time, possibly before such quality results may be available from the KPI tracker 181.

FIG. 2A is a block diagram illustrating an example, non-limiting embodiment of a streaming content delivery system 200 functioning within the system 100 of FIG. 1 in accordance with various aspects described herein. The streaming content delivery system 200 includes one or more content sources, such as the example origin servers 202a, 202b, 203c, generally 202. The origin servers 202 may be operated by owners and/or distributors of content, including streaming media content. The origin servers 202 may be operated by creative media entities, such as studios and/or over-the-top media content distributors. The streaming media content may be stored in one or more repositories, such as the example content data stores 203a, 203b, 203c, generally 203 that may include databases, data warehouses, data farms, and the like.

The example streaming content delivery system 200 also includes a network with a CDN overlay 201. The network with the CDN overlay 201 may include any network, such as the Internet, that includes and/or otherwise provides access to one or more CDN servers. In at least some embodiments, the network with the CDN overlay 201 may include and/or otherwise be in communication with a content routing overlay 207, e.g., the Internet routing registry, a domain name system, and so on. The CDN servers may include streaming-content caching servers 205a, 205b, generally 205. In some embodiments, at least some of the CDN servers 205 may operate to cache content, including media content, such as streaming media content, including video content, audio content, gaming support media content, virtual reality media content, and so on. Cached content may be obtained by the CDN servers 205, e.g., from one or more of the origin servers 202, storing that content locally, such that end-user requests for the same content may be served locally by one or more of the CDN servers 205 instead of from the origin server(s) 202.

In at least some embodiments, one or more of the CDN servers may be arranged according to a layered or tiered arrangement. For example, a first CDN server 205a may correspond to a first layer, i.e., layer 1 of a multilayer configuration, while a second CDN server 205b may correspond to a second layer. The cached content may be distributed and/or otherwise apportioned by the CDN according to the layered configuration to manage network resources and/or access to the origin server(s) in an efficient manner, e.g., by serving repeated requests for common media content by locally provisioned CDN servers 205.

The example streaming-content caching CDN servers 205 are in communication with a local cache storage device 206a, 206b, generally 206. According to the example streaming content delivery system 200, each of the streaming-content caching CDN servers 205a, 205b is in communication with one or more of the origin servers 202a, 202b via a respective network path. By way of nonlimiting example, the CDN servers 205 are in communication with the origin servers via the network with the CDN overlay 201. According to the illustrative example, the first origin server 202a may be in communication with the network with the CDN overlay 201, via a first ISP network 204a. Likewise, the second and third origin servers 202b, 202c may be in communication with the network with the CDN overlay 201, via a second ISP network 204b.

Further according to the illustrative example, a first end-user device, e.g., a smart television (TV) 208a is in communication with the first streaming-content caching server 205a via the first ISP network 204a. Accordingly, streaming content requested by the smart TV 208a may be served in whole or in part by one or more of the origin servers 202 and/or one or more of the streaming-content caching servers 205. Similarly, a second end-user device, e.g., another smart TV 208b is in communication with one or more of the streaming-content caching servers 205 via the second ISP network 204b, while other end-user devices, e.g., another smart TV 208c, and/or smart phone devices 208d, 208e may be in communication with one or more of the streaming-content caching servers 205 via a third ISP network 204c, which may include a mobile network, e.g., a mobile cellular service and/or a satellite service. Accordingly, streaming content requested by the smart phone 208d may be served in whole or in part by one or more of the origin servers 202 and/or one or more of the second streaming-content caching servers 205, as accessible via respective ISP networks 204a, 204b, 204c, generally 204, and the network with CDN overlay 201.

In some embodiments, the requested content item may be a live-streaming media, such as a channel of a streaming radio service, e.g., a streaming radio station as may be available through the iHeart® streaming radio service or TuneIn® Internet radio service. Alternatively or in addition, the requested content item may be a streaming video channel as may be available through a live-streaming video service, e.g., broadcast live stream services, such as Netflix®, Hulu®, YouTubeTV® live streaming broadcast services, streaming services of traditional broadcast networks, and the like. In at least some embodiments, the requested content item may be an audio and/or video on demand (VoD) item, as may be accessed via any of the foregoing example streaming services. Without limitation, the requested content item to be streamed may include personal content, e.g., recorded audio, video and/or live video camera feeds, as may be made available and/or otherwise shared, e.g., using social media platforms, such as FaceBook®, Twitter® and Instagram® social media platforms. In at least some embodiments, streaming media content may be shared and/or otherwise accessed using peer-to-peer networks that in at least some embodiments, may travers at least a portion of the example content delivery system 200. Although many of the examples disclosed herein refer to live streaming and/or on-demand streaming of video content, it is understood that the concepts may be similarly applied to non-video streaming applications as well. For example, KPIs may be reported by client applications, by reporting services and/or otherwise predicted in relation to virtually any large volume data transfer, such as large file downloads, gaming applications, virtual reality applications, geospatial reference data, such as maps, and so on.

In operation, the origin server 202, or more likely, a streaming-content caching server 205 of the network with the CDN overlay 201 may receive a request for a content item from an end-user device, such as the smart phone 208b. The request may be relayed from the smart phone 208a and to at least one of the streaming-content caching servers 205 adapted to respond to the requested content item. The streaming-content caching server 205 may respond to the request by a streaming transport of the requested content item to the requesting smart phone 208b. If any portion of the requested content is not cached at the streaming-content caching server 205, that device may further the request to another streaming-content caching server 205, and/or to the origin server 202. The requested content item may be streamed according to a suitable streaming protocol. By way of example, and without limitation, example streaming protocols may include HTTP based protocols, such as HTTP Live Streaming (HLS), MPEG-DASH, Microsoft® Smooth Streaming (MSS), Real-Time Messaging Protocols (RTMP), Real-Time Streaming Protocols (RTSP), and the like. The streamed content item may be broken down into segments, or chunks and routed according to packet switching through one or both of the network with CDN overlay 201 and the first ISP network 204a.

A CDN service provider may deploy one or more streaming-content caching servers 205 to facilitate multiple requests for the same content item. Such streaming-content caching servers 205 may be strategically deployed based on perceived and/or actual demand, and preferably store at least portions of content items proximal to users. Accordingly, request for a content item may be evaluated, e.g., by a content routing service. The content routing service may be adapted to identify and/or otherwise utilized one or more content-caching servers 205 of the network with the CDN overlay 201, to determine whether at least a portion of the requested content item may be already available in one or more streaming-content caching servers 205. Preferably, a streaming-content caching servers 205 is selected according to logic adapted to facilitate service of the requested content item in a timely and economical manner. In this regard, a first streaming-content caching server 205a may be selected to service at least a portion of the smart TV's request for a particular content item that may have been pre-provisioned in the local cache storage device 206a of the first streaming-content caching server 205a.

According to the illustrative example, the first streaming-content caching server 205a may be geographically proximate, at least in a relative sense, to the smart TV 208a, whereas the second streaming-content caching server 205b may be geographically proximate, at least in a relative sense, to the smart phone 208b. Without limitation, it is envisioned that a requested content item may be serviced responsive to a request from one or more of the smart TVs 208a, 208b, 208c and/or one or more of the smart phones 208d, 208e via one or more of the origin server 202, and/or one or more of the first, second and third streaming-content caching servers 205. Selections as to which device and/or system 202. 205 services a particular portion of a requested content item may be based on one or more of local availability, network conditions, e.g., congestion, data rates, user subscription level, and so forth. For those applications including the network with the CDN overlay 201, requests served directly by one or more of the origin servers 202 may be restricted, e.g., to streaming-content caching servers 205, and not end-user devices 208.

The example streaming content delivery system 200 also includes a KPI monitoring server 209. The KPI monitoring server 209 may be in communication with one or more of the end-user devices 208a, 208b, via respective portions of the first ISP network 204a, the second ISP network 204b and/or the network with CDN overlay 201, as the case may be. In at least some embodiments, the end-user devices 208a, 208b, generally 208 may be adapted to monitor one or more aspects of delivery, and/or processing and/or presentation of requested streaming media. For example, the end-user device 208 may include an application program or app adapted to compute one or more KPIs related to a quality of an end-user experience. Without limitation, the KPI values may include any of the examples disclosed hereon or otherwise known to those skilled in the art, such as a record of media start times, a record of media playback stall counts and/or stall rates, a record of media failure-to-start counts and/or rates, an exit-before-media-start count and/or rate, a media rebuffering ratio, average bit rate, or any combination thereof.

In at least some embodiments, monitored records that may include one or more of the various example KPI values may be accessed via a KPI monitoring web service 210. The example KPI monitoring web service 210 may be adapted to monitor the KPI values as reported to any and up to all end-user devices. The monitored records may be retrievable and/or otherwise subscribed to according to the example KPI monitoring web service 210. The records may be parsed, e.g., according to the origin servers 202, the ISP networks 204, the network with CDN overlay 201, type and/or locations of the end-user devices 208, and so on. In at least some embodiments, the monitored records may be retrieved and/or otherwise subscribed to according to geo-locations and/or local streaming-content caching servers 205. Example KPI monitoring services, such as the Conviva® KPI streaming monitoring service may aggregate KPI records over a reporting period, and provide requestors and/or subscribers with access to the aggregated KPI records according to reporting schedules, e.g., daily, weekly, and the like.

In at least some instances, KPI records of such a KPI monitoring server 209 may not be available until the scheduled reporting period has transpired. This may leave a content provider and/or network service provider in situations in which negative user experiences as may be indicative of an anomaly are not discovered until after the fact, i.e., during a post processing period. To the extent an anomaly may have occurred, the damage to a subscriber base and potentially to a brand may have already been done, e.g., with a loss of subscribers and/or negative press. Beneficially, the techniques disclosed herein identify performance issues early, automatically identifying their most likely root causes and allowing service providers to address issues proactively thereby avoiding many end user performance issues.

The example streaming content delivery system 200 also includes a streaming-content quality analyzer 212. The CDN monitor may be in communication with one or more of the afore mentioned system components via one or more of the example networks, such as the example first ISP network 204a. The streaming-content quality analyzer 212 may be adapted to implement one or more of the various techniques disclosed herein, such as establishing a streaming-media KPI threshold that corresponds to a satisfactory end-user quality, applying the streaming-media KPI threshold to identify anomalous conditions, to distinguish whether any such anomalies may be attributable to the streaming-content caching servers 205 and/or perhaps some other portion of the streaming content delivery system 200, such as the origin server and/or the ISP network 204, and for identifying a growth requirement.

In at least some embodiments, one or more of the first and second streaming-content caching servers 205a, 205b may maintain respective first and second server access logs 214a, 214b, generally 214. In at least some embodiments, the server access logs 214 may be maintained locally, e.g., at the respective streaming-content caching servers 205. Alternatively or in addition, the access logs may be reported to and/or otherwise maintained by an operation and maintenance (O&M) server 216. The access logs 214 may include one or more of a processing time, a cache hit and/or miss ratio, a number of requests directed towards the streaming-content caching server 205, an address and/or a geolocation, transport protocol response codes, e.g., HTTP response code types and/or counts, corresponding time values and/or indices, and so on. In at least some embodiments, one or more of the various logged items may be associated with and/or otherwise logged according to one or more of a corresponding content site, e.g., an origin server or web service, a requesting device identifier, a requesting device type or category, a media content type, a requesting application and/or presentation application, and so on.

In general, the end-user devices may include mobile devices, such as smart phones, tablet devices, notebook computers, virtual reality (VR) and/or augmented reality (AR) viewing devices, smart vehicles, drones, robots, smart appliances, and the like. Without limitation, the end-user devices may include other devices, such as desktop computers, servers, gaming systems, smart appliances, smart building automation or control systems, industrial automation systems, surveillance systems and the like. It is important to note that although the various examples disclosed herein refer to content largely in the form of media, e.g., audio and/or video, it is understood that the techniques may be applied to any electronic content, e.g., digital content, that may be transported by a communications network. Other examples of content may include, electronic gaming, still images, e.g., digital art, photographs, maps, e.g., terrain maps, road maps, and the like. Still other examples of content may include files, such as documents, executable programs, e.g., application programs or apps, and the like.

Figure 2B:
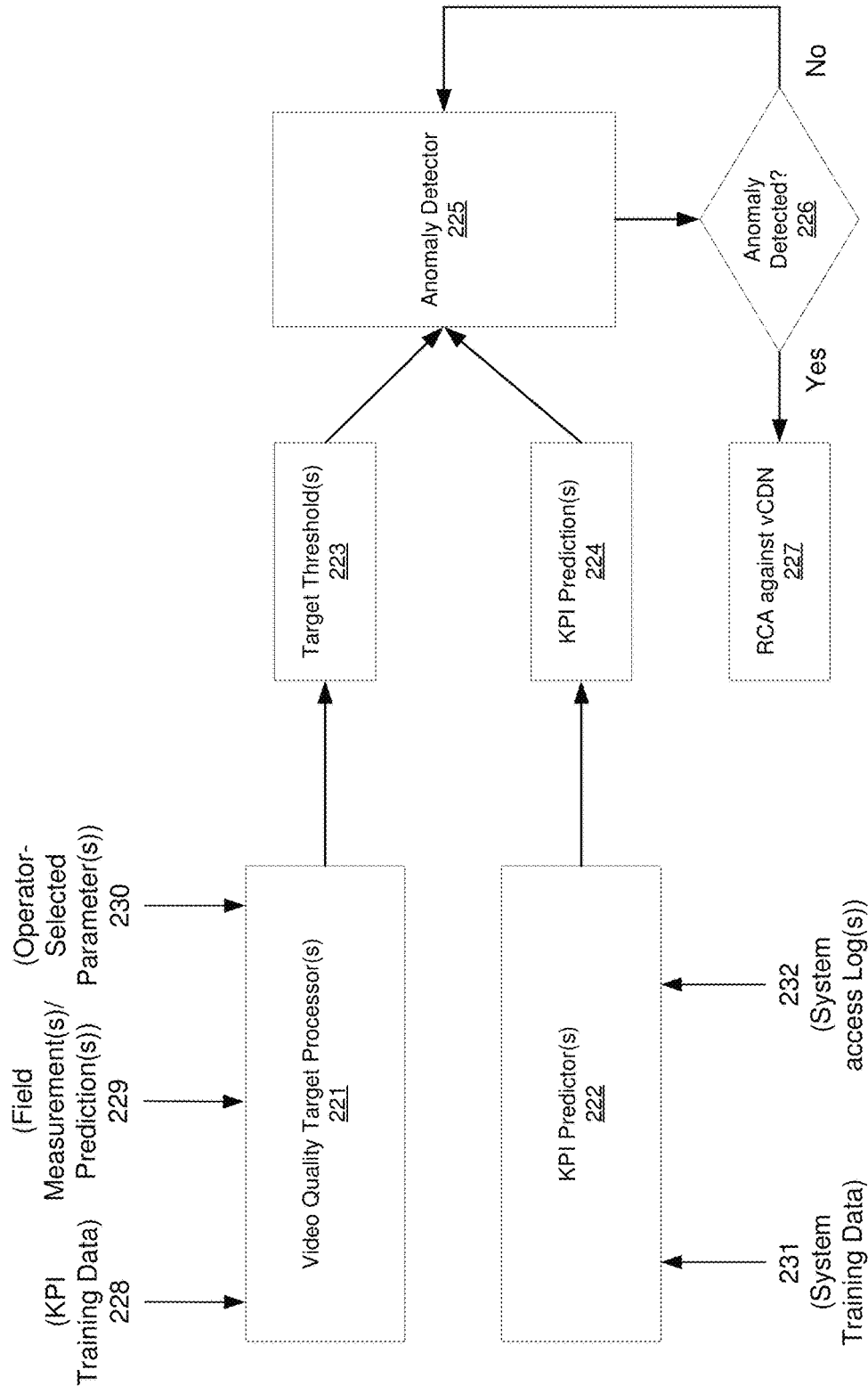
FIG. 2B is a block diagram illustrating an example, non-limiting embodiment of a streaming-media quality monitor functioning within the content delivery system of FIG. 2A in accordance with various aspects described herein.

FIG. 2B is a block diagram illustrating an example, non-limiting embodiment of a streaming-media quality monitor 220 functioning within the streaming content delivery system 200 of FIG. 2A in accordance with various aspects described herein. The streaming-media quality monitor 220 may facilitate one or more of an identification of one or more streaming-media KPI thresholds that corresponds to a satisfactory end-user quality. In at least some embodiments, at least a portion of the identification of the streaming-media KPI thresholds may be automated. Identification of the one or more streaming-media KPI thresholds may include an association of a time series of KPI values with a CDN system and/or a segment and/or subsystem of the CDN system, such as a live-streaming caching server. The KPI values may correspond to a streaming-media quality as may be observed and/or otherwise reported by number of streaming media consumption devices served by the CDN system, segment, or subsystem. In at least some embodiments, the time series of KPI values may be obtained from a centralized KPI monitoring service, such as Conviva® streaming-media analytics service.

According to the illustrative embodiments, different types of KPI values may be predicted according to operational data as may be obtained via access logs of one or more systems, subsystems and/or devices as may be involved in sourcing, transporting, caching and/or otherwise delivering content. For example, the access logs may be obtained from the CDN subsystem, e.g., origin server and/or cache server logs. In at least some embodiments, predicted KPI values may be obtained according to a machine learning process, e.g., by training an AI module based on previously recorded training data. In at least some embodiments, the thresholds may be applied, e.g., in combination with CDN subsystem access log information, to identify anomalous conditions that may be attributable to content caching servers, and/or for identifying a growth requirement for content caching capacity.

By way of example, the streaming-media quality monitor 220 is directed to streaming video and includes one or more video quality target processors 221. In at least some embodiments, the video quality target processor(s) 221 may receive one or more input values. Example input values may include, without limitation, a streaming video quality KPI data set 228, including a time series of KPI values that may be distinguished and/or otherwise identified according to an identifier or marker, such as an identity of a reporting end-user device, transaction identifiers, a network address and/or a location indicator, such as a geolocation indicator. Examples of other inputs may include measurements and/or predictions 229, such as records of video quality, measured KPI values, and the like. Still other input parameters 230 may include operator-selected parameters as may be determined by one or more of a CDN operator, a content owner, an ISP operator, a mobile network operator, and/or an end user application. For example, some end-user applications may require a predetermined KPI threshold value to ensure satisfactory end-user quality experience.

Examples of such input parameters 230 may include, without limitation, one or more of a KPI alarm threshold (T_alarm), a KPI capacity-growth threshold (T_threshold), a KPI observation period as may be described according to one or more of an KPI observation start time (T_s) and/or a KPI observation end time (T_e). The threshold alarm, T_alarm, may be based on widely accepted industrial standards, and is introduced to serve as an upper bound for acceptable video quality KPIs. One example can be the video startup time cannot exceed some value, "x" seconds, otherwise, viewers will most likely drop the viewing session or eventually drop the subscription of the streaming services. Still other input parameters 230 may include a KPI time window (T_w) and/or an anomaly number threshold (N), as may be used to identify anomalous conditions as is described more fully below.

It is important to note that any or all of the KPI training data 228, the field measurements and/or predictions 229 and the selectable input parameters 230 may be provided for one type of KPI value, or multiple types of KPI values. The video quality target processor 221 may be adapted to accept the one or more input values 228, 229, 230 and to determine one or more target thresholds 223. Examples of target thresholds 223 may include, without limitation, an upper bound KPI value, or set of values that may correspond to an upper bound KPI curve 242a (e.g., as illustrated and described further below in reference to FIG. 2C), an average upper-bound KPI value (T_up), a capacity-growth threshold, e.g., as may be determined as a difference between the alarm threshold and the average upper-bound KPI value (T_alarm−T_up). Examples of other inputs or target thresholds may include, without limitation, an average KPI value(s) and/or average or mean value KPI curve 244 and/or a lower-bound KPI value(s) and/or lower bound KPI curve 243. Still other examples of target thresholds may include, without limitation, an upper-value average or mean 246a of the upper bound KPI curve 242a, a lower-value average or mean 246b of the lower bound KPI curve 243, or some other value, such as a measure of standard deviation, and so on. Determination of the target thresholds 223 may be based at least in part on one or more of the input values 228, 229, 230.

In at least some embodiments, the streaming-media quality monitor 220 includes one or more KPI predictor(s) 222. The KPI predictor 222 may receive one or more inputs, such as training data 231 and system access log records 232. By way of example and without limitation, the training data 231 may include a time series of KPI values as may have been prepared and/or otherwise obtained during operation of a streaming content delivery system 200 (FIG. 2A). For example, the training data 231 may include KPI values reported by end-user devices 208 and/or by a KPI monitoring server 209. It is understood that in at least some applications, the KPI values may include more than one type of KPI value. The system access log records 232 may be obtained from one or more segments and/or subsystems of the streaming content delivery system 200. For example, the system access log records 232 may be obtained for one or more of the content-caching servers 205.

In at least some embodiments, the system access log records 232 include time references that permit the KPI predictor(s) 222 to associate and/or otherwise correlate the observed time series of KPI values of the training data 231 with one or more of the system access log records 232. In at least some applications, one or more of the KPI values of the training data 231 and/or one or more of the system access log records 232 may be identified by one or more attributes, such as a transaction identifier and/or a geolocation. These types of attributes may be used by the KPI predictor(s) 222 to associate and/or otherwise correlate the observed time series of KPI values of the training data 231 with one or more of the system access log records 232.

Such correlated information may be applied to an AI module adapted to apply machine learning to predict KPI values. For example, the correlated information may be used as a training set, in which one or more types of the system access log records 232 are provided as inputs to a neural network, e.g., a deep neural network (DNN) model, adapted to predict one or more types of KPI values. The training data may be used to train such a DNN model, which may be used to predict one or more types of KPI values based on actual system access log records 232. Notably, KPI predictions 224 may be obtained from actual CDN performance data without having yet received any of the recorded and otherwise reported KPI values by any end-user devices 208 and/or KPI monitoring server 209.

The example streaming-media quality monitor 220 further includes an anomaly detector 225. The anomaly detector may be adapted to detect conditions in which a streaming video quality of a streaming-media service may fall below some threshold level of service. For example, the anomaly detector may receive one or more of the target thresholds 223 from the video quality target processor(s) 221 and the KPI prediction(s) 224 from the KPI predictor(s) 222. The anomaly detector 225 may evaluate the predicted KPI values in view of the one or more target thresholds to evaluate a level of service according to end-user streaming video quality.

The anomaly detector 225 may provide an output including an indication as to whether an anomaly was detected, and in at least some embodiments, supplemental information, such as the type of KPI value associated with the anomaly, a geolocation and/or subsystem of the streaming content delivery system 200 correlated to the anomaly, an extent of the anomaly, a time and/or time window in which the anomaly occurred, and so on.

An output of the anomaly detector 225 may be provided to an anomaly response module 226. The anomaly response module 226 may evaluate the received output of the anomaly detector 225, e.g., applying a decision logic as to what actions may be initiated responsive to a detected anomaly. For example, to the extent an anomaly is detected and/or otherwise identified by the anomaly detector 225, the anomaly response module 226 may initiate a root cause analysis. To the extent the anomaly detector output indicated an associated subsystem, the root cause analysis may be directed responsive to the associated subsystem. For example, if the subsystem is one of the streaming-cache servers 205, the root cause analysis 227 may be directed towards that particular streaming cache server 205. To the extent that an anomaly is not detected, the anomaly detector 225 and/or the KPI predictor(s) 222 and/or the video quality target processor(s) 221 may continue to process subsequent portions of the system access log records 232 and continue in a like manner.

Figure 2C:
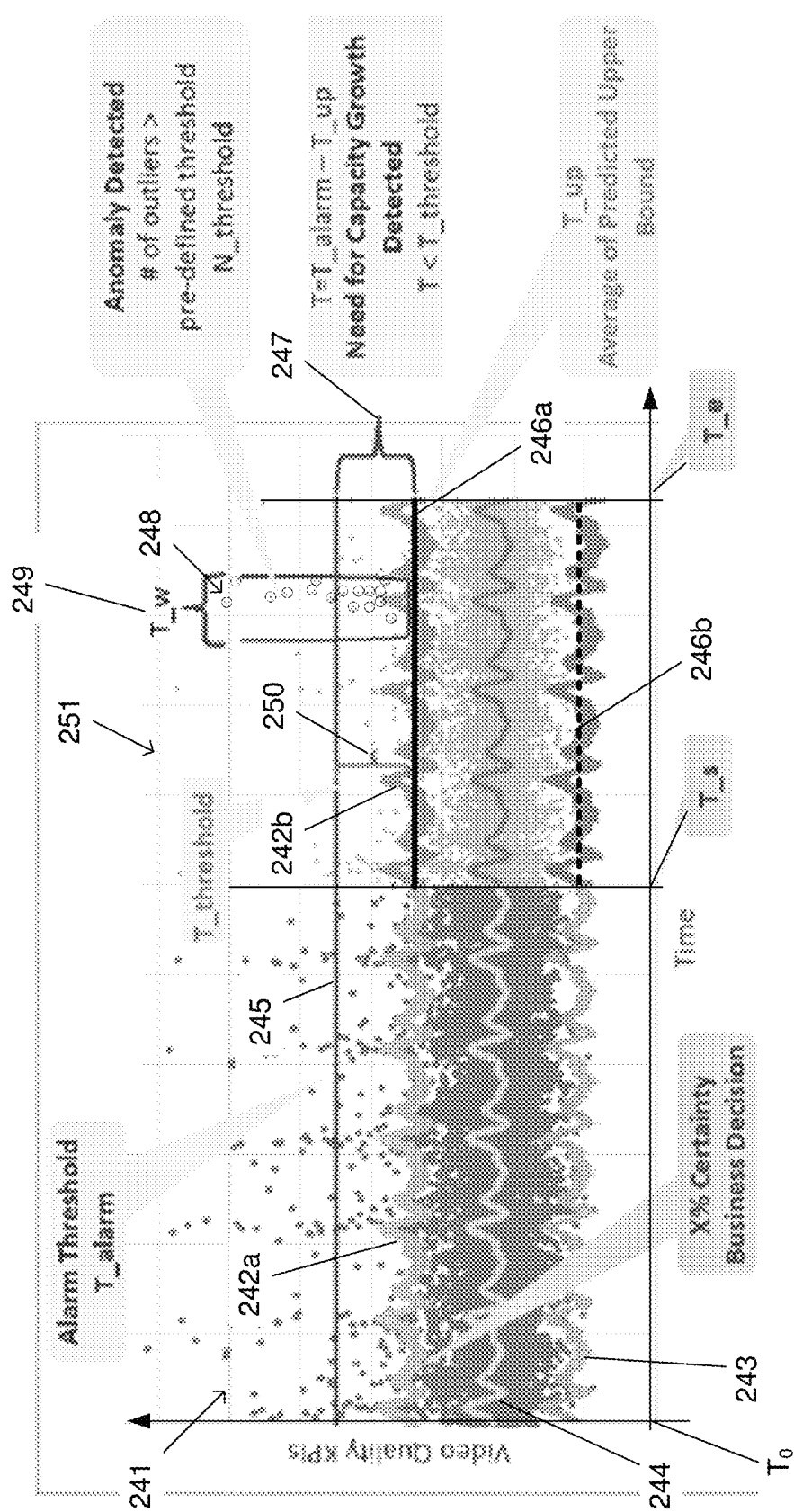
FIG. 2C is a graph illustrating an example, non-limiting embodiment of a streaming-media quality analysis obtained via the streaming-media quality monitor of FIG. 2B in accordance with various aspects described herein.

FIG. 2C is an example of a representative streaming-media quality KPI analysis graph 240. The example KPI analysis graph 240 illustrates an example, non-limiting embodiment of a streaming-media quality analysis as may be obtained via the streaming-content quality analyzer 212 of FIG. 2A and/or the video quality target processor 221 of FIG. 2B in accordance with various aspects described herein. The KPI analysis graph 240 includes a time series of KPI values. The KPI values are associated with a particular type of KPI, e.g., a particular type of streaming-media quality KPI, such that similar graphs may be obtained and/or analyzed in a like manner for any of a number of different types of KPIs including, but not limited to, the example types of KPIs disclosed herein.

According to the example KPI analysis graph 240, KPI values of the same type are plotted as points on a Cartesian coordinate system presenting the KPI values versus time. It is envisioned that in at least some embodiments, the time series of KPI values may represent a massive data set, e.g., providing plotted KPI values for scores, hundreds, thousands, tens of thousands, and perhaps even more devices for which KPI values are reported, e.g., end-user devices 208 (FIG. 2A). It is envisioned further that according to any particular time index, there may be a relatively large number of KPI values reported for a corresponding relatively large number of end-user devices 208.

The example KPI analysis graph 240 may divided into two regions. A first region extends from a reference time $T_0$ to a later time T_s and a second region extends between time T_s and time T_e. Time increments may be measured in fractions of seconds, e.g., milliseconds, seconds, and/or larger duration periods, e.g., tens of seconds, minutes, or hours. The first region includes a first group of plotted KPI values 241, represented as a dense collection extended from a lower KPI value to some upper KPI value, but also having a bunching around some mid-level KPI value. The second region similarly includes a second group of plotted KPI values 251, represented as a second dense collection extended from a lower KPI value to some upper KPI value, but also having a bunching around some mid-level KPI value. A first level of analysis may be applied to the first group of plotted KPI values 241 in order to identify groupings, e.g., percentiles according to KPI values or ranges at each time value or time index. According to such groupings, it is possible to identify an upper bound associated with a certainty value. The certainty value may be described as a proportion, ratio and/or percentage, e.g., y %. According to the certainty level, an upper bound KPI value can be identified, such that a KPI sample has a y % certainty to be less than the predicted upper KPI value. The predicted upper bound KPI value may vary at each time index according to the sampled KPI values of that time index.

The example KPI analysis graph includes a first portion of an example upper bound KPI curve 242a within the first region. The upper bound KPI curve 242a indicates a maximum KPI value that will be experienced by an ensured percentage of end-user devices. In this manner, a quality factor of the end-user streaming-media experience may be ensured to at least some degree. Without limitation, other representative KPI curves may be established, such as an average value KPI curve 244, e.g., representing an average KPI value for a set of KPI samples associated with a particular time index and repeated for other time indices. Yet another example includes a lower bound KPI curve 243 that may be determined according to an absolute minimum KPI value for a set of KPI samples associated with a particular time index, and repeated for other time indices. Alternatively or in addition, the lower bound KPI curve 243 may be determined according to some statistical minimum value, e.g., a minimum KPI certainty of x %. According to the minimum certainty level, a lower bound KPI value can be identified, such that a KPI sample has a x % certainty to be greater than the predicted upper KPI value.

It is understood that the certainty value of y % may be established according to a business decision or tradeoff. In at least some embodiments, performance of the streaming content delivery system 200 and/or any individual portion thereof, such as the streaming-content caching server 205 (FIG. 2A) may be varied, and corresponding impact or effect measured as a variation in one or more of the upper bound KPI curve 242a, the average value KPI curve 244 and/or the lower bound KPI curve 243. It is understood that the example KPI analysis graph 240 may be used by a content owner and/or a CDN service provider to engineer a desired performance, e.g., engineering a preferred aspect of the upper bound KPI curve 242a, such as an average value of the upper bound KPI curve 242a over an observation period.

According to the example KPI analysis graph 240, some portion of the first group of plotted KPI values 241 are above the upper bound KPI curve 242a. Being above the upper bound KPI curve 242a may not necessarily indicate that the associated end-user streaming-media experience was unsatisfactory. That may depend, to at least some extent, upon the actual KPI value. The example KPI analysis graph 240 also includes a KPI alarm threshold 245, indicating an upper bound of tolerable KPI value. The KPI alarm threshold 245 is represented as a straight, horizontal line at a KPI value corresponding to the KPI alarm threshold 245. As the upper bound KPI curve 242a may vary according to the received KPI samples, the KPI alarm threshold 245 remains fixed.

In at least some embodiments, one or more aspects of the first group of plotted KPI values 241, and one or more of the determined and/or otherwise measured upper bound KPI curve 242a, the average value KPI curve 244 and/or the lower bound KPI curve 243 may be used to train an AI module, e.g., a neural network, to recognize and/or otherwise predict one or more of a second portion of the upper bound KPI curve 242b, the average value KPI curve 244 and/or the lower bound KPI curve 243 in the second region, based on KPI samples and/or KPI predictions in the second region. According to such an application of machine learning, the second group of plotted KPI values 251 may be applied to the trained neural network to obtain a second portion of the upper bound curve 242b extending between times T_s and T_e.

One or more other thresholds may be determined, e.g., according to user input, recommendations and/or widely accepted values, such as a capacity-growth threshold, T_threshold 250 and/or an anomaly evaluation window, T_w 249. The capacity-growth threshold 250 may be determined as a preferred KPI buffer region between the KPI alarm threshold 245 and an average KPI upper bound value 246a, e.g., determined as an average of the upper bound KPI curve across time indices of an observation period, e.g., between times T_s and T_e. In at least some applications, the upper bound KPI curve 242b is obtained, e.g., from reported KPI samples and/or predicted KPI values, and averaged over the observation period to obtain the average KPI upper bound value 246a. A calculated difference 247 between the KPI alarm threshold the average KPI upper bound value 246a may be compared to the capacity-growth threshold 250. To the extent the computed difference is less than the capacity-growth threshold 250, a recommendation may be determined to add capacity and/or growth. In at least some embodiments, further details of any such recommendation may be based upon an association of the KPI values with a subsystem of the streaming content delivery system 200 (FIG. 2A), such as the streaming-content caching server 205, e.g., indicating that a greater cache storage capacity and/or cache processing related to accessing and/or responding to cache hits may be advantageous in any capacity and/or growth planning.

It is understood that in at least some embodiments, an indication of a favorable KPI may be a low KPI value, i.e., lower is better. Consider a KPI that relates to a measure of a time-to-start for streaming video. In such instances, an upper average KPI upper bound value 246a may serve as a meaningful threshold reference, such that KPI values above the threshold may lead to an indication of an unfavorable condition or anomaly for the end user. Similarly, it is understood that in at least some embodiments, an indication of a favorable KPI may be a high KPI value, i.e., higher is better. In such instances, a lower average KPI upper bound value 246b may serve as a meaningful threshold reference, such that KPI values below the threshold may lead to an indication of an unfavorable condition or anomaly for the end user.

Figure 2D:
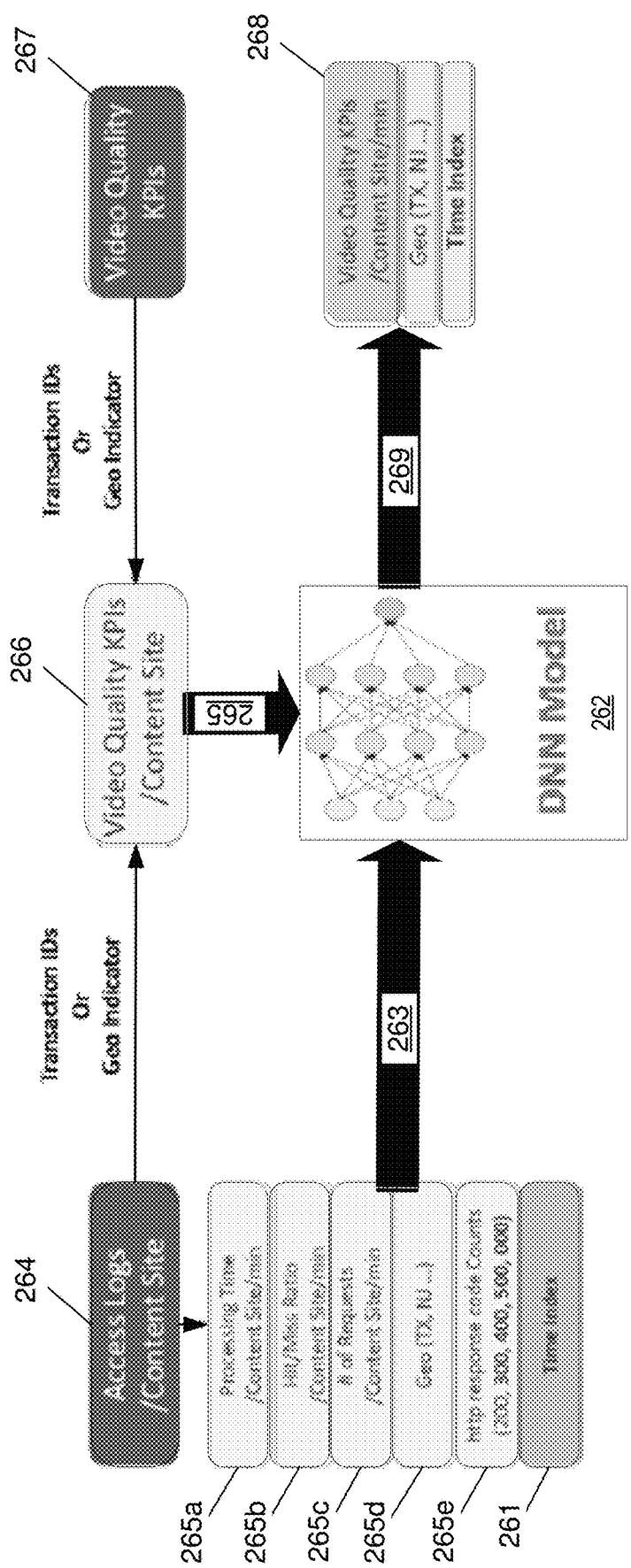
FIG. 2D is a block diagram illustrating an example, non-limiting embodiment of a streaming-media quality predictor functioning within the streaming-media quality monitor of FIG. 2B in accordance with various aspects described herein.

FIG. 2D is a block diagram illustrating an example, non-limiting embodiment of a streaming-media quality predictor 260 functioning within the streaming-media quality monitor 220 of FIG. 2B in accordance with various aspects described herein. The example streaming-media quality predictor 260 includes a DNN model 262 adapted to predict one or more different types of KPI values based on one or more different types of access log values. In more detail, access logs 264 may be maintained for one or more subsystems of the streaming content delivery system 200 (FIG. 2A), such as the origin server 202, the ISP network 204, the network with CDN overlay 201 and/or the streaming-content cache servers 205. By way of example, access logs 264 may refer to one or more of the first and second streaming-content cache servers 205a, 205b, understanding that they may be applied in a like manner to any of the other example system components and/or subsystems.

The example access logs 264 may record one or more of processing time values 265a, content and/or cache hit/miss records 265b, numbers of content and/or cache requests 265c, a location reference, such a geolocation reference, e.g., geocoordinates, an address or region, e.g., a state, county, city, town zip code, and the like. In at least some embodiments, one or more of the recorded or logged values 265a, 265b, 265c, 265d may be recorded on a per content site and/or per cache server 205. Alternatively or in addition, one or more of the recorded or logged values 265a, 265b, 265c, 265d may be logged and/or otherwise recorded per time, e.g., according to a time value or time index 261 as may be utilized by and/or maintained in association with the access logs 264.

It is envisioned that in at least some embodiments, one or more other features may be recorded in a similar manner, e.g., on a per site and/or per time index. Without limitation, such other features may include response codes, such as response codes associated with a transport protocol, such as HTTP response codes. Such logged and/or otherwise recorded HTTP response code values 265e may include counts of one or more specific codes and/or categories of codes, e.g., maintaining separate HTTP response code counts for 200-type codes (2xx), 300-type codes (3xx), 400-type codes (4xx), 500-type codes (5xx), 000-type codes (0xx), and the like.

The streaming-media quality predictor 260 also receives a record of one or more streaming-content KPI values, e.g., video quality KPI values 267 obtained from and/or otherwise attributable to one or more subsystems. The example video quality KPI values 267 may be recorded and/or otherwise associated with one or more content sites, such as one or both of the example origin servers 202a, 202b, one or both of the example ISP networks 204a, 204b, the example network with CDN overlay 201 and/or one or both of the example streaming-content cache servers 205a, 205b. In at least some embodiments one or more of the access logs 264 and/or the video quality KPI values 267 may include other distinguishing indicia, such as transaction identifiers and/or geo location indicators. Such example indicia may be used to identify associations between content of the access logs 264 and the video quality KPI values 267. According to the illustrative example, the streaming-media quality predictor 260 includes a video quality KPI correlator 266 adapted to correlate video quality KPI values 267 to one or more of the access logs 264 and/or one or more of the recorded and/or logged values 265a, 265b, 265c, 265d. In at least some embodiments, these associations may be made according to one or both of a transaction identifier and/or a geolocation indicator.

By way of example, content of one or more of the access logs 264 may be provided as training inputs 263 to the DNN model 262. Likewise, one or more of the video quality KPI values 267 as correlated by the video quality KPI correlator 266 with the access logs 264 may be provided as training inputs 265 to the DNN model 262. The DNN model 262, in turn, may be adapted to predict one or more video quality KPI values based on one or more stored records of the access logs 264, such as the example logged items 265a, 265b, 265c, 265d, 265e. The DNN model 262, having received stored records of actual access logs 264 and records of actual video quality KPI values 267 via the video quality KPI correlator 266, together with an association allowing the DNN model 262 to associate particular video quality KPI values 267 record with particular access log 264 records to facilitate a training process. A size and/or type of the example training data may be varied until a determination is made that the DNN model 262 is suitably trained, e.g., operating within a tolerable error in predictions of training video quality KPI values 267 associated by the video quality KPI correlator 266 with training access logs 264.

Once suitably trained, the DNN model 262 may receive recent, e.g., real time or near real time values from the access logs 264, for which correlated video quality KPIs have not been received and/or otherwise determined. one or more of the example logged items 265a, 265b, 265c, 265d, 265e may be provided as input to the DNN model 262, which predicts corresponding and/or otherwise associated video quality KPI predictions based on the earlier training. The predicted video quality KPI values 268 may be provided by the DNN model 262 as an output 269. The example output 269 may include one or more of the predicted video quality KPI values 268, geolocation information, e.g., as determined according to the access logs 264 utilized in the predictions and/or a time value or time index, e.g., to facilitate a temporal alignment and/or association of the predicted video quality KPI values 268 and the access logs 264, or more particularly, with an associated content site and/or geolocation of the input data obtained from the access logs 264.

Some examples are provided below illustration purposes. A choice of one or more different types of KPIs may be made depending on particular modeling scenarios and expected outcomes. According to a first type of KPI, an average processing time per specified time interval, the average time may be an indication of an average number of milliseconds spent by cache server processing the entire client request. According to another type of KPI, a number of client requests per specified time interval. Yet another type of KPI may include a measure of cache hits and/or cache misses. For example, the KPI may indicate an average ratio of HIT/MISS per specified time interval. It is generally understood that cache results codes (CRC) may be reported by content access logs. When a value of CRC is HIT, content is served from the cache server. However, when a value of CRC is MISS, the requested content may be retrieved from another source, such as the origin server, or a parent proxy, and sent it to the requesting client. According to this type of KPI, a relatively low HIT/MISS ratio may indicate that the cache is sized too small.

Yet another type of KPI value include a measure of transport protocol response codes. For example, average counts of specified HTTP response codes may be determined and/or otherwise recorded per specified time interval. HTTP response status codes indicate whether a specific HTTP request has been successfully completed. In at least some embodiments, the counts of 3xx, 4xx and 5xx HTTP codes are tracked and used as training features. The foregoing are merely examples of the various types of KPI values that may be identified and used in association with the various techniques disclosed herein.

Figure 2E:
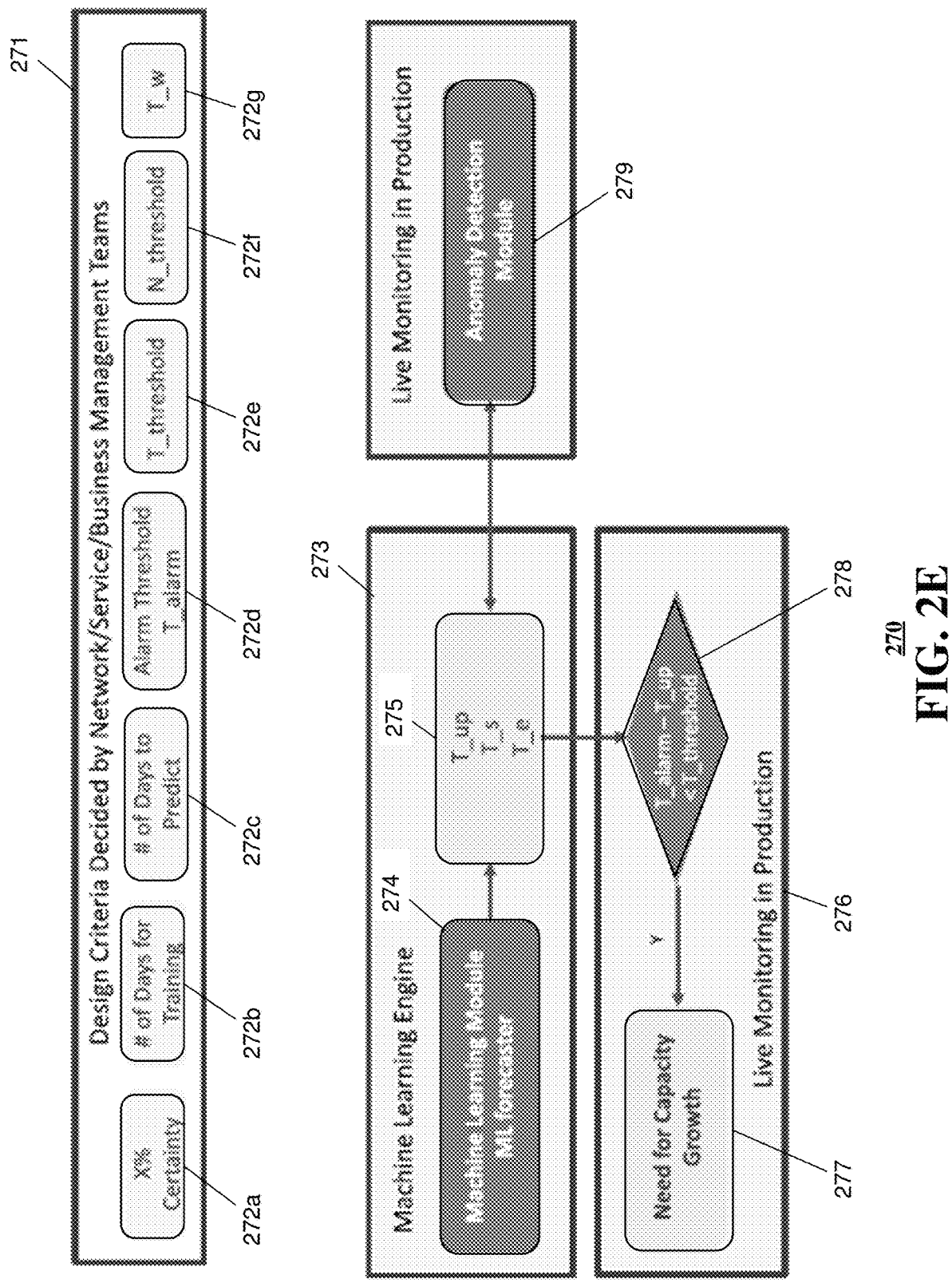
FIG. 2E is a block diagram illustrating another example, non-limiting embodiment of a streaming-media quality analyzer functioning within the streaming-media quality monitor of FIG. 2B in accordance with various aspects described herein.

FIG. 2E is a block diagram illustrating another example, non-limiting embodiment of a streaming-media quality analyzer 270 functioning within the streaming-content quality analyzer 212 of FIG. 2A in accordance with various aspects described herein. In at least some embodiments, the streaming-media quality analyzer 270 includes a machine learning engine 273, an anomaly detection module 279, and optionally, a capacity-growth monitor 276. The streaming-media quality analyzer 270 may further identify one or more design criteria 271 that may be leveraged by one or more of the machine learning engine 273, the anomaly detection module 279 and the capacity-growth monitor.

Examples of the one or more design criteria 271 may include, by way of example and without limitation, a certainty value 272a, x % associated with a predicted KPI upper bound threshold, T_u, such that a predicted KPI value has an x % certainty to be less than the predicted upper bound threshold. Examples of other design criteria 271 may include a number of training days 272b as may be allocated for training by the machine learning engine 273, and/or days to predict 272c, as may be identified for obtaining KPI predictions from an example machine learning forecaster module 274 of the machine learning engine 273 that may be adapted to predict and/or otherwise forecast KPI values for the identified days to predict 272c. Still other examples of design criteria 271 may include one or more of an alarm threshold 272d, T_alarm, a capacity-growth threshold 272e, T_threshold, a tolerable number of outliers threshold 272f, N_threshold, and/or an anomaly evaluation time window value or threshold 272g, T_w.

The machine learning forecaster module 274 may be trained according to a suitable set of training data, e.g., as disclosed elsewhere herein, to predict one or more types of KPI values based on log data recorded and/or otherwise reported by one or more segments, and/or subsystems of a streaming content delivery system 200 (FIG. 2A). The suitably trained machine learning forecast may predict KPI values, that may include a projected and/or otherwise forecast upper bound KPI value, T_up, e.g., as may be associated with the x % certainty value 272a. The value of T_up may be computed and/or otherwise applied to forecast KPI values by a threshold module 275 that receives predictions and/or forecasted KPI values from the machine learning forecaster module 274.

In at least some embodiments, the streaming-media quality analyzer 270 includes a live monitoring capability. For example, the machine learning forecaster module 274, having been suitably trained, may be applied to real time and/or near real time data as may be obtained in the form of reported KPI values and/or data from access logs of one or more segments and/or subsystems of the streaming content delivery system 200 (FIG. 2A). In at least some embodiments, the machine learning forecaster module 274 includes an anomaly detection module 279 adapted to support a live monitoring capability. By way of example, the anomaly detection module 279 may be adapted to compare predicted and/or forecast KPI values against one or more of the various thresholds. Such comparison thresholds may include user define thresholds, such as any combination of those provided via the design criteria 271 and/or any of thresholds that may have been determined at least in part by the machine learning engine, such as the upper bound KPI value, T_up. The anomaly detection module 279 may count anomalies, e.g., anomalous KPI values 248 (FIG. 2C) that lie above T_up, within a sequence of respective time windows, T_w. To the extent the counted number of anomalies exceeds some threshold value, e.g., N_threshold 272f, an anomaly may be detected, declared, logged and/or otherwise reported by the anomaly detection module 279. Alternatively or in addition, anomalies may be detected according to any single and/or threshold number of KPI values exceeding an alarm threshold 272d, T_alarm. In at least some embodiments, the anomaly counting is based upon KPI values exceeding the alarm threshold 272d, instead of the upper bound KPI value, T_up.

In at least some embodiments, the streaming-media quality analyzer 270 includes a capacity-growth monitor 276. The capacity-growth monitor 276 may analyze predicted and/or forecast results obtained from the machine learning forecaster module 274, to determine whether the system is providing a predetermined overhead capacity, e.g., to account for variability as may be experienced in any practical implementation. One example of an overhead capacity may be characterized as a capacity-growth threshold 272e, T_threshold. This value may be defined as a specified minimum required difference between the alarm threshold 272d, T_alarm, and the average value of an upper bound KPI threshold, T_up. The example capacity-growth monitor 276 may determine the difference between the alarm threshold 272d, T_alarm, and the average value of an upper bound KPI threshold, T_up for predicted, forecast and/or reported KPI values, and to compare that difference, at 278, to a capacity-growth threshold 272e: T_alarm−T_up<T_threshold. To the extent that the measured difference is less than a minimum specified threshold, the capacity-growth monitor 276 may provide an output, a report and/or recommendation 277 indicating that capacity-growth may be required. Such recommendations may indicate a need for capacity growth, which may indicate that systems of one or more operators participating in a streaming-content service delivery chain, e.g., ISP, CDN, content origin servers, may operate close to their engineering limits. By capacity growth, it can be adding caching capacity to existing content distribution site; or introducing additional content distribution sites where viewing demands significantly increases; or increase capacity at origin content servers that are owned by content provider, or ISP's access speed.

In at least some embodiments, such a report or recommendation may provide further details, e.g., indicating where the capacity-growth should be evaluated. For example, if the recommendation 277 is based upon predicted KPI values obtained based upon access logs from the streaming-content caching servers 205 (FIG. 2A), the recommendation may include details that additional storage and/or processing, and/or bandwidth capacity should be considered to add capacity and/or growth. An expectation would be that if additional capacity and/or growth were introduced into the streaming content delivery system 200 (FIG. 2A), then under similar circumstances, e.g., a similar number streaming-content requests for the same or similar source content, and/or by the same or similar number, type and/or location of end-user devices 208 would result in a subsequent capacity-growth analysis in which a comparison of the aforementioned difference to the same capacity-growth threshold 272e: T_alarm−T_up<T_threshold, would be satisfied. Otherwise, a subsequent capacity-growth request and/or recommendation may be initiated by the capacity-growth monitor 276.

Figure 2F:
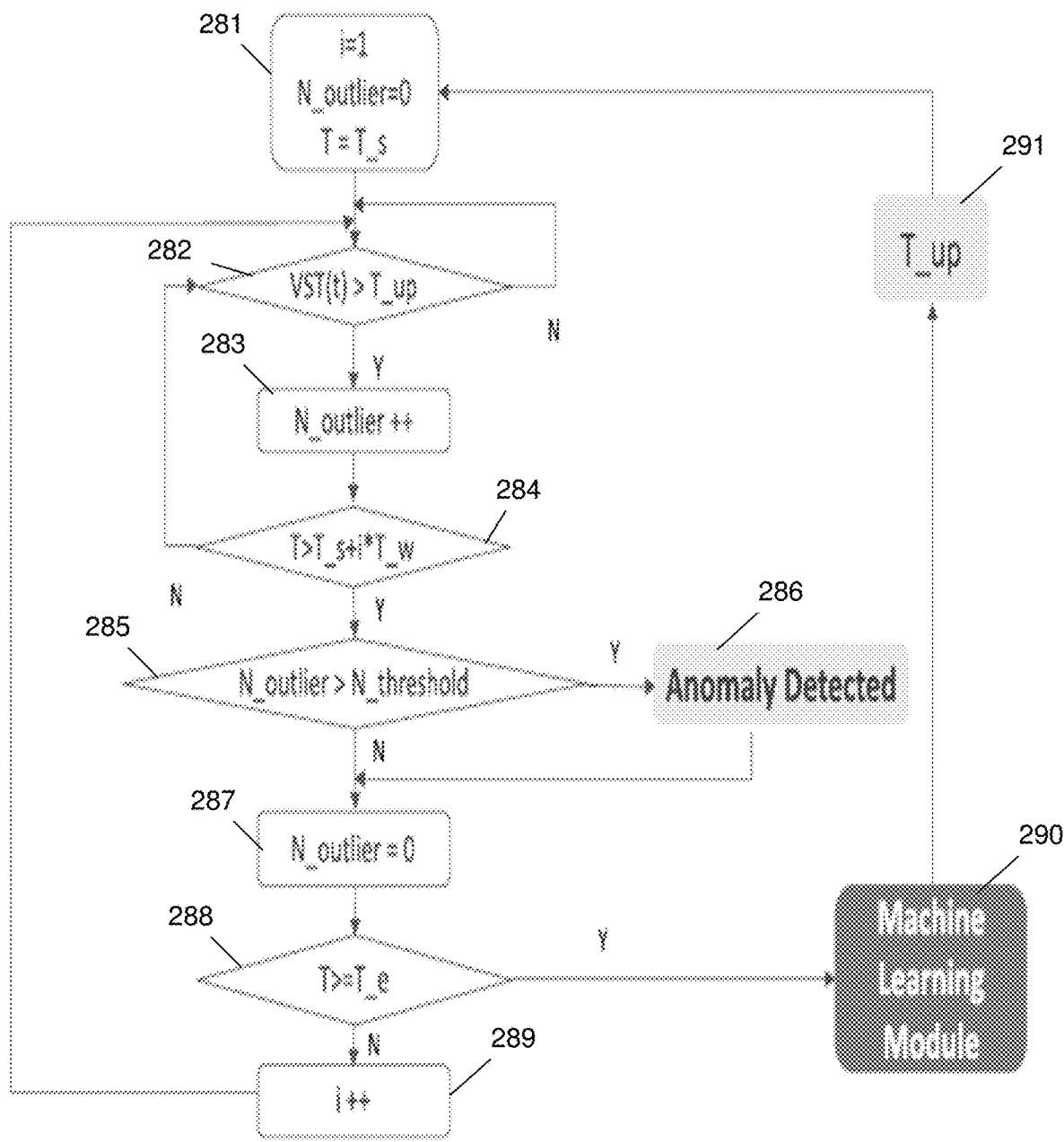
FIG. 2F depicts an illustrative embodiment of a streaming-media quality monitoring process in accordance with various aspects described herein.

FIG. 2F depicts an illustrative embodiment of a streaming-media quality monitoring process 280 in accordance with various aspects described herein. The streaming-media quality monitoring process 280 evaluates a time series of KPI values according to the one or more of the example thresholds disclosed herein to detect a possibility of an anomalous condition. By way of illustrative example, the process initializes at 281 at a start time, T_s. Initialization may include initialization of an index variable, e.g., i=1, and establishing a variable N_outliers, that counts a number of outliers within a given anomaly threshold time window, T_w, to zero. The streaming-media quality monitoring process 280 continues to evaluate KPI samples of the time series of KPI values during a time interval initiated by the start time T_s. A query is made at 282 as to whether a particular KPI sample, KPI(t) exceeds a threshold value. For example, the query may determine whether the KPI(t) sample is greater than an average value of an upper bound KPI threshold, T_up. According to this example, an outlier may be defined as a KPI sample that exceeds the upper bound KPI threshold, T_up. To the extent it is determined at 282 that the sample KPI(t)>T_up, the variable, N_outliers counting the number of outliers is incremented by one. The query step 283 may be performed for as many KPI values as may be associated with a current time index, T.

The time index, T, may be incremented, e.g., according to subsequent KPI values of the time series of KPI values, and compared at 284 to determine if the incremented time value still falls within the current time window, T_w, being evaluated. The comparison 284 may be determined according to: T>T_s+i*T_w. On a first pass, the index variable i is initialized to zero, so the incremented time value would be compared to a width of the first window, extending from time T_s to time T_w. To the extent it is determined at 284 that the incremented time falls within the same anomaly threshold time window, T_w, subsequent KPI values are evaluated at 282 to determine whether they exceed the average upper bound KPI threshold, T_up. To the extent they do, the anomaly count value is incremented, as is the time index.

To the extent it is determined at 284 that the incremented time exceeds the current anomaly threshold time window, T_s+i*T_w, the streaming-media quality monitoring process 280 next compares at 285 the established count of observed outliers, T_outliers to a threshold number of outliers, N_threshold. To the extent that the number of observed outliers, N_outliers, of a given time window, T_w, exceeds the threshold number of outliers, N_threshold, otherwise stated as N_outlier>N_threshold, an anomaly may be detected and/or otherwise determined at 286. The variable, N_outliers, counting the number of outliers may then be reset to zero at 287, and the time value, T, incremented.

In the event of video quality degradation, commercially available real time log analyzers can pull above mentioned metrics for the corresponding time window. Then experts with domain knowledge will perform root cause analysis (RCA) that sometimes involves manipulating large amount of data and can be time consuming. Especially, if the root cause for video quality degradation is not from CDN caching sites, it is challenging to quickly rule out the problems at cache servers. Beneficially, this type of process may be automated, e.g., by using a trained DNN model to predict video KPIs. If an anomaly is detected against targets, e.g., T_up and N_threshold derived from measured video KPIs, using predicted video KPIs, there is a high likelihood that cache servers may be the root cause for the video quality degradation observed. Otherwise, most likely that video quality degradation is due to other factors such as origin servers or networking connectivity between viewers and cache servers. Accordingly, results obtained using the various techniques disclosed herein may facilitate a source and/or a responsible operator for that portion of a streaming content delivery system that may be associated with any such anomalies.

In at least some embodiments, the incremented time value, T, may be compared at 288 to an end time threshold, T_e. To the extent it is determined at 288 that the incremented time value, T, has not exceeded an end time threshold, T_e, the window index variable, i, may be incremented at 289 to a subsequent threshold time window, T_w, and the streaming-media quality monitoring process 280 return to and continue from step 282, according to the subsequent threshold time window, e.g., extending from T_s+i*T_w to T_s+2i*T_w.

To the extent that it is determined at 288 that an end time threshold, T_e has been exceeded, the streaming-media quality monitoring process 280 may, in at least some embodiments, initiate a machine learning update at 290. For example, a machine learning module may update one or more of the upper bound KPI values to obtain an updated upper bound KPI curve 242*a* (FIG. 2C) and/or an updated average value of the upper bound KPI curve 242*a* over an observation period, to obtain an updated upper bound KPI threshold T_up at 291. The streaming-media quality monitoring process 280 may be repeated again, from step 281 according to a new start time, T_s having occurred after an expiration of a previous end time T_e.

Figure 2G:
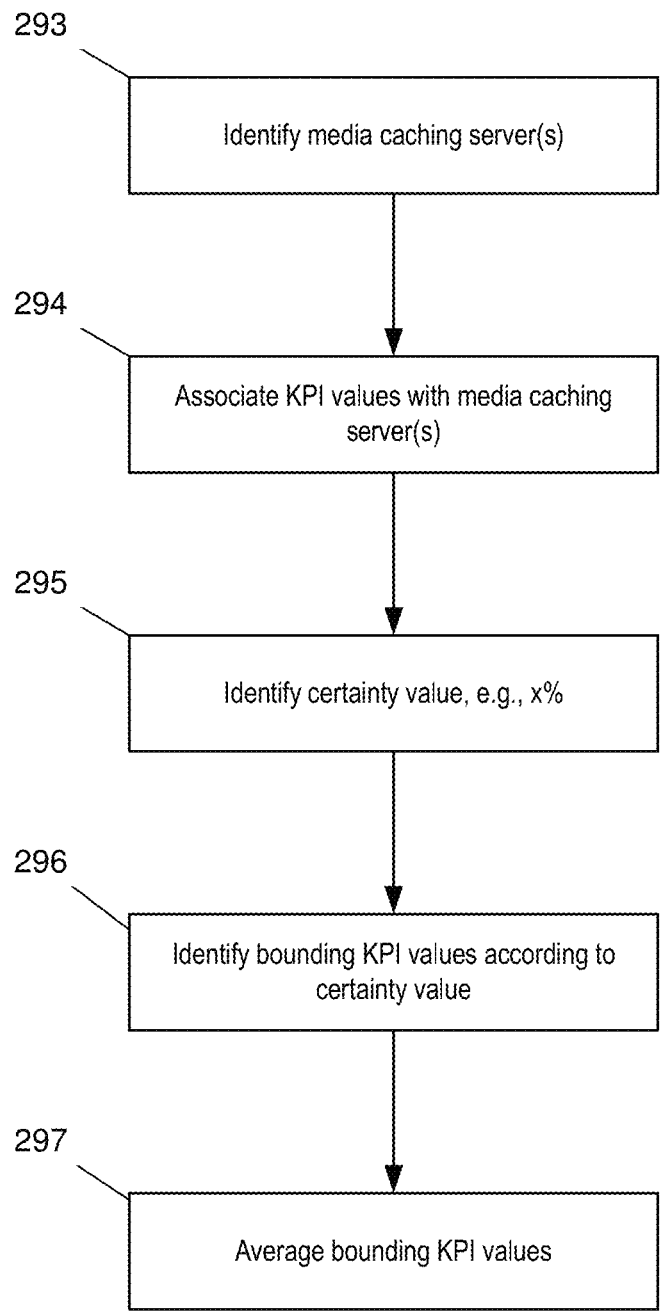
FIG. 2G depicts an illustrative embodiment of a quality threshold process in accordance with various aspects described herein.

FIG. 2G depicts an illustrative embodiment of a quality threshold process 292 in accordance with various aspects described herein. The process 292 identifies one or more media caching servers at 293. In at least some embodiments, the media caching servers may be identified according to a network architecture and/or from prior caching server deployment records. One or more different quality values, such as time series of KPI values are associated, at 294, with the one or more of the identified media caching servers. The KPI values may relate to any of the various examples disclosed herein and/or otherwise known to those skilled in the art. It is envisioned that in at least some embodiments, the process 292 may be performed for one particular type of KPI value. Alternatively or in addition, the process may be repeated for multiple different types of KPI values.

When multiple types of KPI values are evaluated, it is envisioned that the techniques disclose herein may be performed independent, upon each particular type of KPI value and/or according to some combination of different types of KPI values. For example, anomalies may be detected independently for different types of KPI values. An occurrence, type and/or severity of an anomalous condition may be based upon a combination of the independently determined values. Alternatively or in addition, an occurrence, type and/or severity of an anomalous condition may be determined according to one or more of a rule, a policy and/or logic based on the independently determined KPI analyses. For example, some anomalies, according to a corresponding type of KPI value may take precedence over another type of anomaly. Likewise, a joint occurrence of anomalies detected by separate analyses of more than one different type of KPI values, when associated with the same system component, segment, or subsystem, e.g., the caching servers, and/or a particular type of content request, may jointly indicate a heightened and/or otherwise different anomaly reporting and/or alarm.

According to the example process, a certainty value, x %, such as the various certainty values disclosed herein in relation to the KPI values, is identified at 295. A threshold bounding KPI or quality value, e.g., an upper bound KPI value, e.g., T_up, is next determined according to the certainty value at 296. The upper bound quality values, e.g., the upper bound KPI values, are averaged at 297, to obtain a single average value for each of a number of different KPI values as may be separately evaluated according to the example process 292.

Figure 2H:
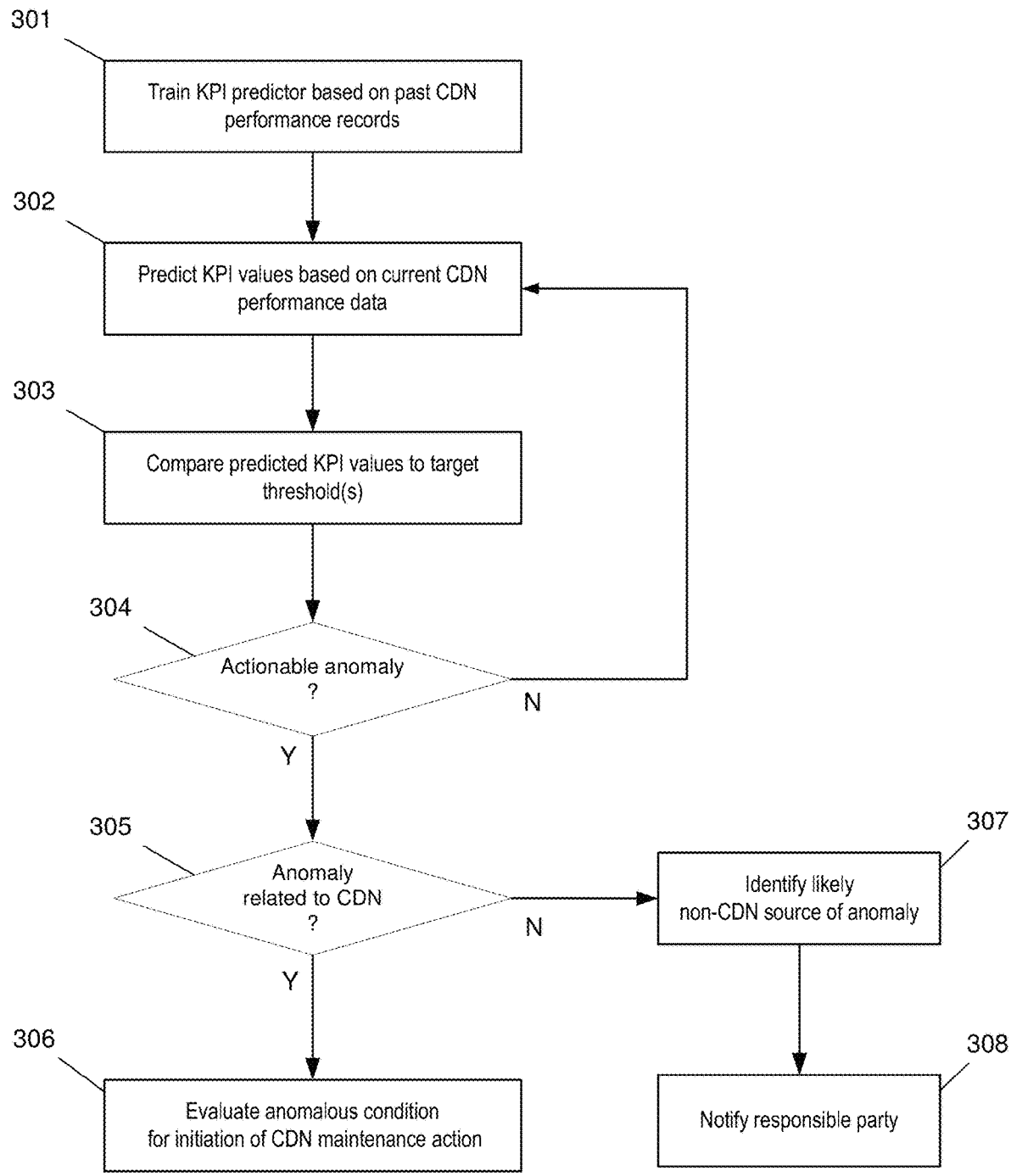
FIG. 2H depicts an illustrative embodiment of a CDN anomaly detection process in accordance with various aspects described herein.

FIG. 2H depicts an illustrative embodiment of a CDN anomaly detection process 300 in accordance with various aspects described herein. According to the example embodiment, machine learning may be applied at 301 to train a KPI predictor. For example, an AI module, such as a deep neural network, may be trained based on past CDN performance records. For example, past records, such as CDN access logs, may be correlated to separately obtained values of at least one KPI metric, e.g., as reported by UE and/or a KPI monitoring service. Training may occur by providing CDN performance records as input to the AI module and obtaining an output as an indication of a value of the KPI metric. An error may be determined in comparison to the separately correlated values of the KPI metric, and used to adjust performance of the AI module according to the error. The process may be repeated to systematically improve performance of the AI module.

The KPI predictor, once suitably trained, e.g., to achieve an acceptable error performance, may be utilized at 303 to predict values of the KPI metric based on actual system performance data. For example, values of a KPI metric indicative of a media service may be predicted based on performance data of a CDN deployed to facilitate delivery of the media service. System data may include operational records or logs from one or more system elements or components engaged in delivery of the media service. By way of example, such operational records may include, without restriction, access logs of one or more servers of the CDN and/or content source servers. It is understood that predictions of the values of the KPI metric may be performed in real time and/or near real time. It is understood that near real time may include that period between an update of an access log and a reporting of an observed KPI value, e.g., by UE and/or a separate KPI reporting service.

According to the example CDN anomaly detection process 300, the predicted values of the KPI metric may be compared at 303 to one or more target thresholds. At least some of the target threshold(s) may include, without limitation, generally accepted or established threshold values for the KPI metric, e.g., a maximum threshold value for a video start delay, a maximum number and/or duration of video stalls, and so on. Alternatively or in addition, the target threshold(s) may include other target threshold values that may vary according to network, e.g., CDN, conditions at a given time period. By way of example, the target threshold may include a KPI metric threshold value, such that operation within the threshold boundary provides a measured certainty that a predetermined percentage of users, CDN services and/or media sessions will experience KPI metric performance within the threshold boundary.

It is understood that an anomaly may be detected at 304 based on the comparisons of predicted values of a KPI metric to the target threshold(s) obtained at 303. In some embodiments, threshold number of values of the KPI metric are permissible, e.g., within some predetermined time window, e.g., as disclosed in relation to FIGS. 2C and 2F. In such instances, an anomaly may be detected at 304 responsive to predicted values of the KPI metric exceeding the threshold number within the predetermined time period. To the extent that an anomaly is not detected, the example CDN anomaly detection process 300 may resume by predicting further values at 302, comparing those values to the target threshold at 303 and detecting anomalies at 304.

To the extent that an anomaly is detected at 304, the example CDN anomaly detection process 300 may engage in a root cause analysis. For example, the process 300 may determine at 305 whether the anomaly is related to the CDN. For example, if the anomaly was determined according to values of the KPI metric determined from CDN access logs, it may be inferred that the CDN may represent at least a contributing factor to the anomaly. To the extent it is determined at 305 that the anomaly may be related to the CDN, an evaluation of the anomalous condition may be initiated at 306. For example, a maintenance action and/or request may be initiated responsive to the anomaly. It is envisioned further that further guidance for any such maintenance action may be determined according to an association of any access logs and/or UE that may be involved with the anomaly. Any such correlation of the anomaly to one or more subsystems and/or components, e.g., particular CDN server(s) may be indicated within the maintenance action to facilitate localization and/or evaluation of a potential source or root cause of the anomaly.

To the extent it is determined at 305 that the anomaly may be related to a source other than the CDN, a further evaluation may be initiated at 307 to identify a likely non-CDN source of the anomaly. For example, a detected and/or reported anomaly that does not correlate to a predicted anomalous condition determined from the CDN access logs may be an indication that a source of the problem lies with the content source and/or the Internet service provider network, or perhaps some other network segment, such as the last mile and/or the user premises equipment. Alternatively or in addition, an evaluation of access logs as may be obtained from a content service provider and/or ISP, may be used to obtain predictions of values KPI metrics that may be further evaluated, e.g., according to the example process 300, to identify potential anomalies. In such a manner, the anomaly may be associated with a source of the access logs. In at least some embodiments, a responsible party other than the CDN service provider may be notified of the predicted anomaly at 308. The notification alone and/or in combination with an indication of other details, such as the type(s) of KPI metrics involved, content source servers, portions of the ISP network and/or UE may be provided to facilitate localization and/or evaluation of a potential source or root cause of the anomaly.

While for purposes of simplicity of explanation, the respective processes are shown and described as a series of blocks in FIGS. 2F, 2G and 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
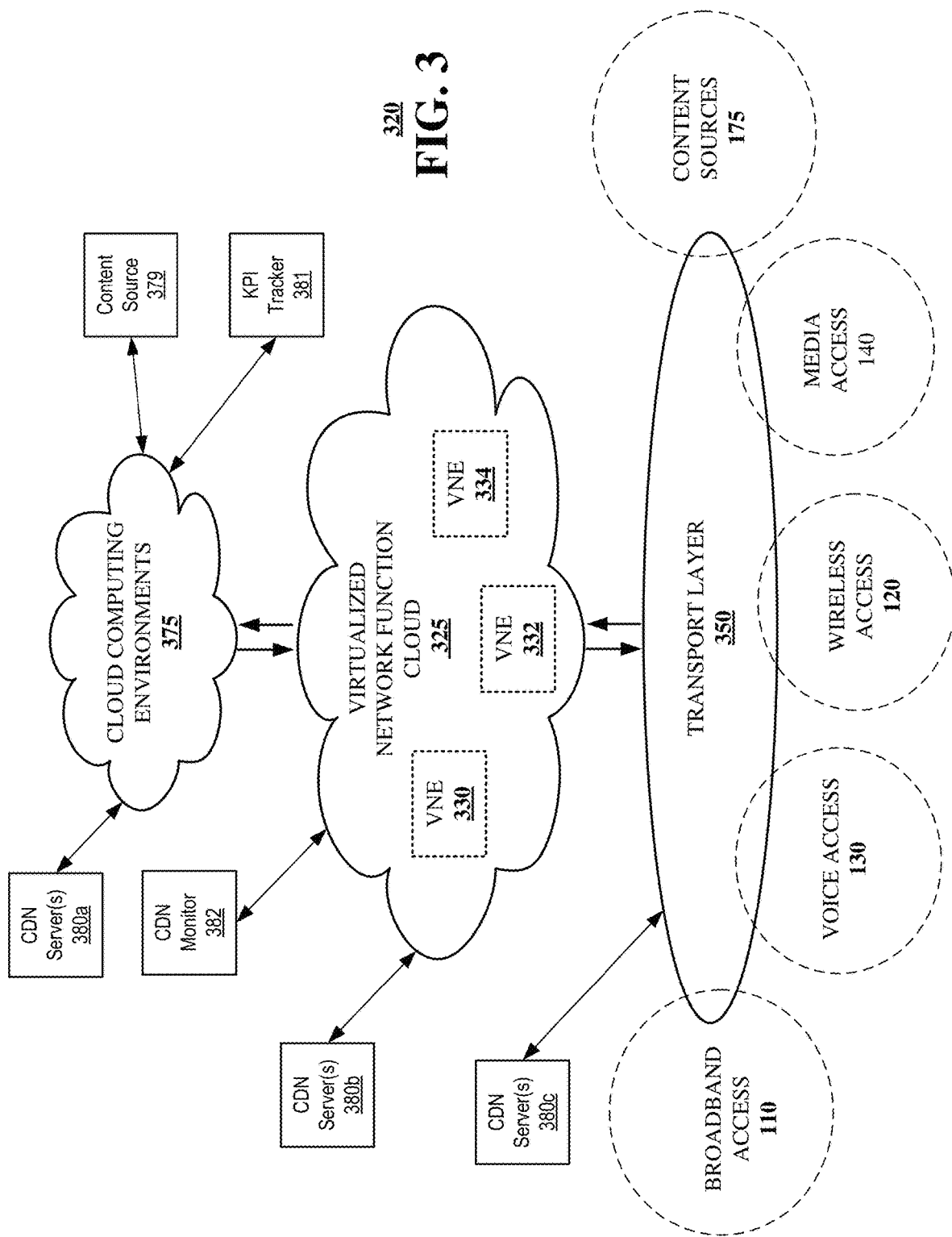
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 320 in accordance with various aspects described herein. In particular a virtualized communication network is presented that can be used to implement some or all of the subsystems and functions of the system 100, the subsystems and functions of system 200, 220, 240, 260, 270 and the streaming-media quality monitoring processes 280, 292, 300 presented in FIGS. 1, 2A, 2B, 2C, 2D, 2E, 2G, 2H and 3. For example, virtualized communication network 320 can facilitate in whole or in part, an automated identification of a streaming-media KPI threshold that corresponds to a satisfactory end-user quality. The identification process may include associating a time series of KPI values with a CDN subsystem, such as a live streaming caching server, in which the KPI values correspond to a number of streaming media consumption devices served by the CDN subsystem. In at least some embodiments, the time series of KPI values may be obtained from a centralized KPI monitoring service. Alternatively or in addition, the KPI values may be estimated according to access logs obtained from the CDN subsystem. The KPI value estimation process may apply machine learning, e.g., training an AI module based on previously recorded training data. In at least some embodiments, the thresholds may be applied, e.g., in combination with CDN subsystem access log information, to identify anomalous conditions that may be attributable to the streaming-content caching servers 205 (FIG. 2A), and/or for identifying a growth requirement for content-caching capacity.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175, including media content sources, for distribution of content, including live-streaming content, to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers, and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

In at least some embodiments, the virtualized communication network 320 includes one or more content sources 379 adapted to provide content suitable for streaming-content delivery. The example virtualized communication network 320 also includes one or more CDN servers 380a, 380b, 380c, generally 380. The CDN servers 380 may include one or more streaming-content caching servers as may be strategically distributed within the virtualized communication network 320 to facilitate large numbers of requests for similar and/or the same content items, the distributed CDN servers 380 serving at least a portion of those requests without requiring them to be served by the content sources 379. The example virtualized communication network 320 also includes a CDN monitor 382 and a KPI tracking system or service 381. The KPI tracking system or service 381 may monitor, request and/or otherwise collect and record metrics associated with a quality of streaming-content deliveries by the virtualized communication network 320. In at least some examples, the quality metrics include video quality metrics as may be represented by one or more of the example KPI disclosed herein and/or otherwise known to those skilled in the art. The KPI data may be provided to the CDN monitor 382, which may also be adapted to acquire access log records from one or more segments and/or subsystems of the virtualized communication network 320 adapted to participate in live-streaming delivery of content.

The CDN monitor 382 may be adapted to monitor quality performance of such live-streaming delivery to evaluate performance against business goals to ensure that end users receive a measured assurance of a satisfactory experience. In at least some embodiments, the CDN monitoring may occur in a real time and/or near real time, possibly before results may be available from the KPI tracking system or service 381.

Figure 4:
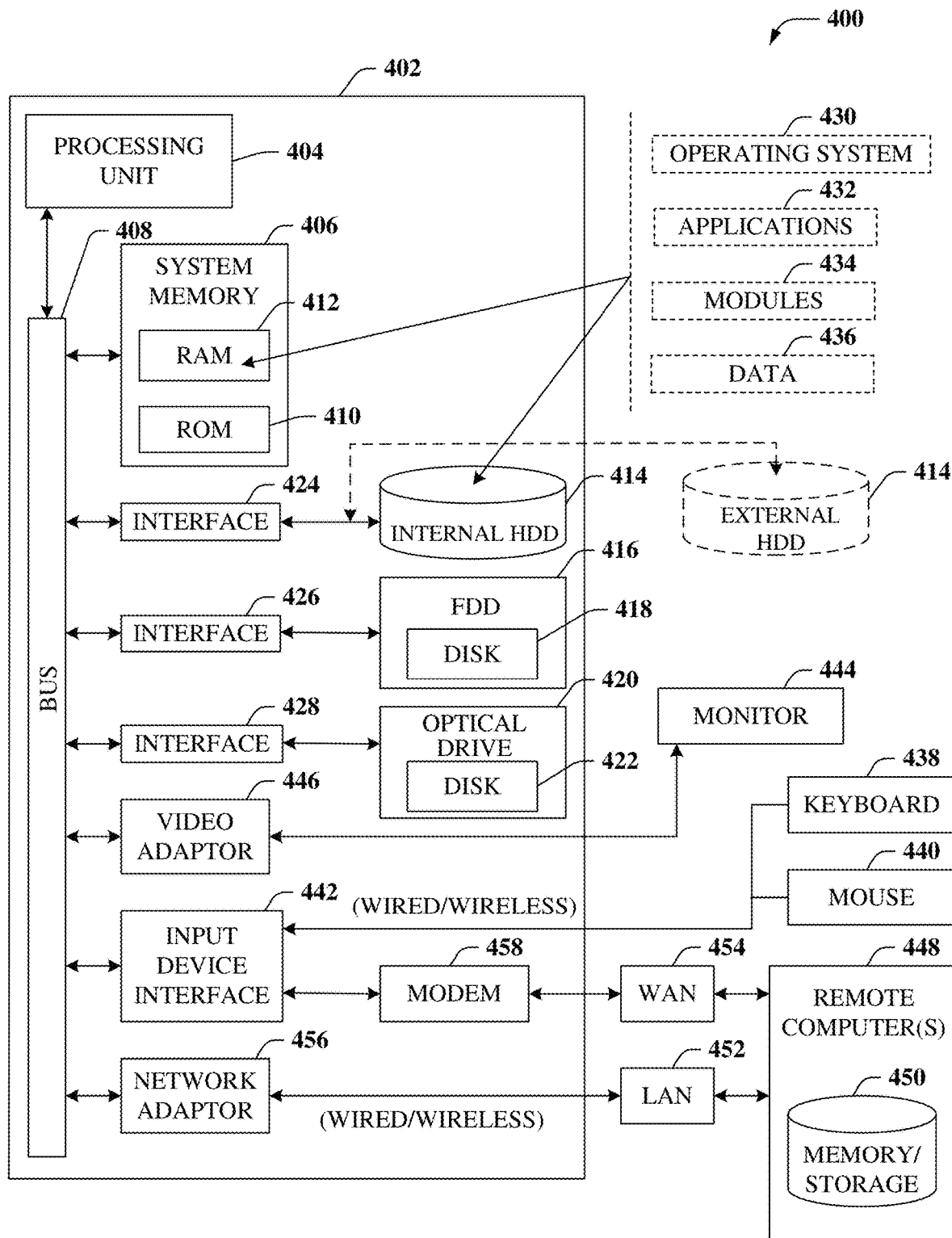
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part, an automated identification of a streaming-media KPI threshold that corresponds to a satisfactory end-user quality. The identification process may include associating a time series of KPI values with a CDN subsystem, such as a live streaming caching server, in which the KPI values correspond to a number of streaming media consumption devices served by the CDN subsystem. In at least some embodiments, the time series of KPI values may be obtained from a centralized KPI monitoring service. Alternatively or in addition, the KPI values may be estimated according to access logs obtained from the CDN subsystem. The KPI value estimation process may apply machine learning, e.g., training an AI module based on previously recorded training data. In at least some embodiments, the thresholds may be applied, e.g., in combination with CDN subsystem access log information, to identify anomalous conditions that may be attributable to the streaming-content caching servers 205 (FIG. 2A), and/or for identifying a growth requirement for content-caching capacity.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared, and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
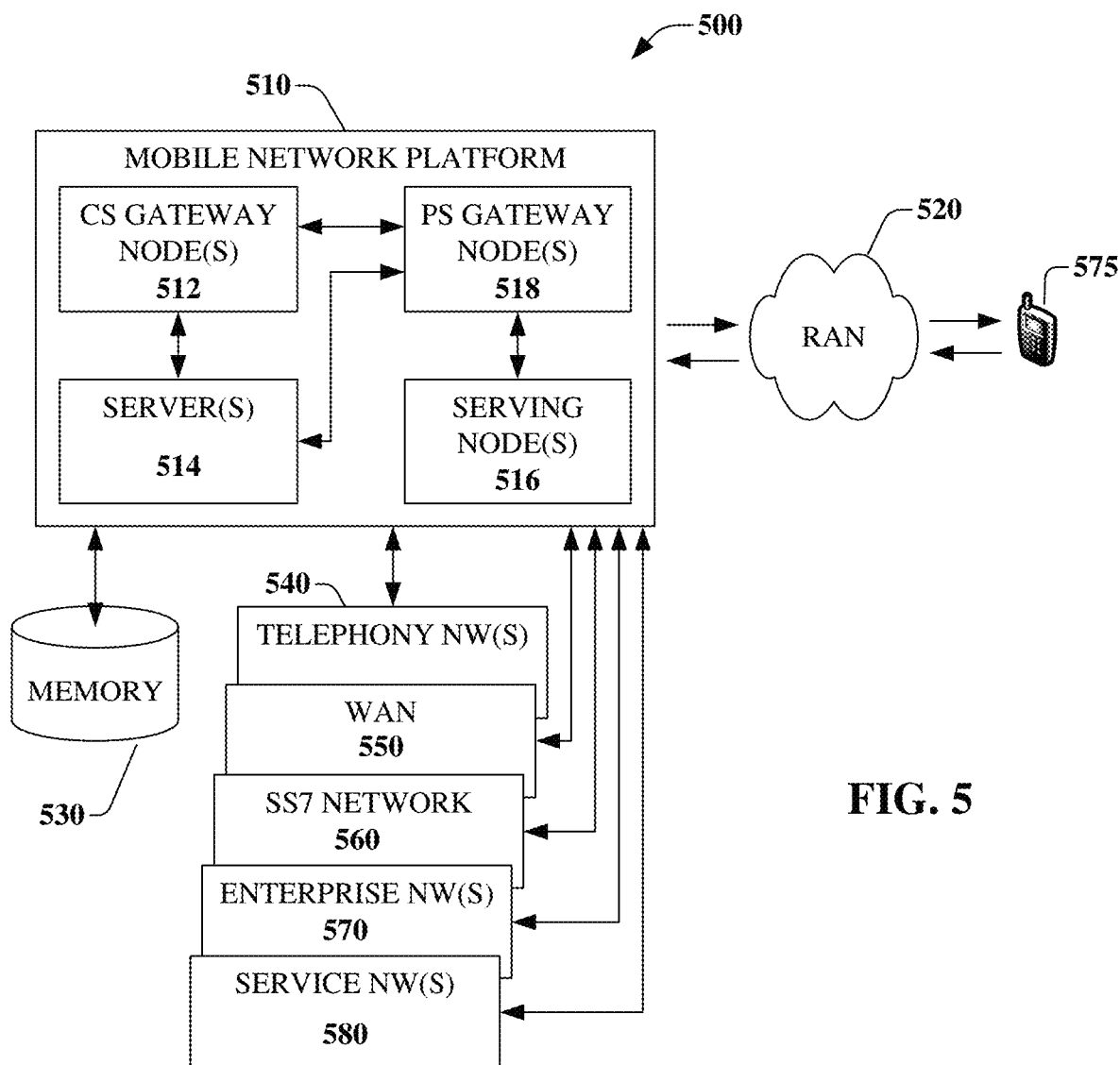
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part, an automated identification of a streaming-media KPI threshold that corresponds to a satisfactory end-user quality. The identification process may include associating a time series of KPI values with a CDN subsystem, such as a live streaming caching server, in which the KPI values correspond to a number of streaming media consumption devices served by the CDN subsystem. In at least some embodiments, the time series of KPI values may be obtained from a centralized KPI monitoring service. Alternatively or in addition, the KPI values may be estimated according to access logs obtained from the CDN subsystem. The KPI value estimation process may apply machine learning, e.g., training an AI module based on previously recorded training data. In at least some embodiments, the thresholds may be applied, e.g., in combination with CDN subsystem access log information, to identify anomalous conditions that may be attributable to the streaming-content caching servers 205 (FIG. 2A), and/or for identifying a growth requirement for content-caching capacity.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, including a live-streaming content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
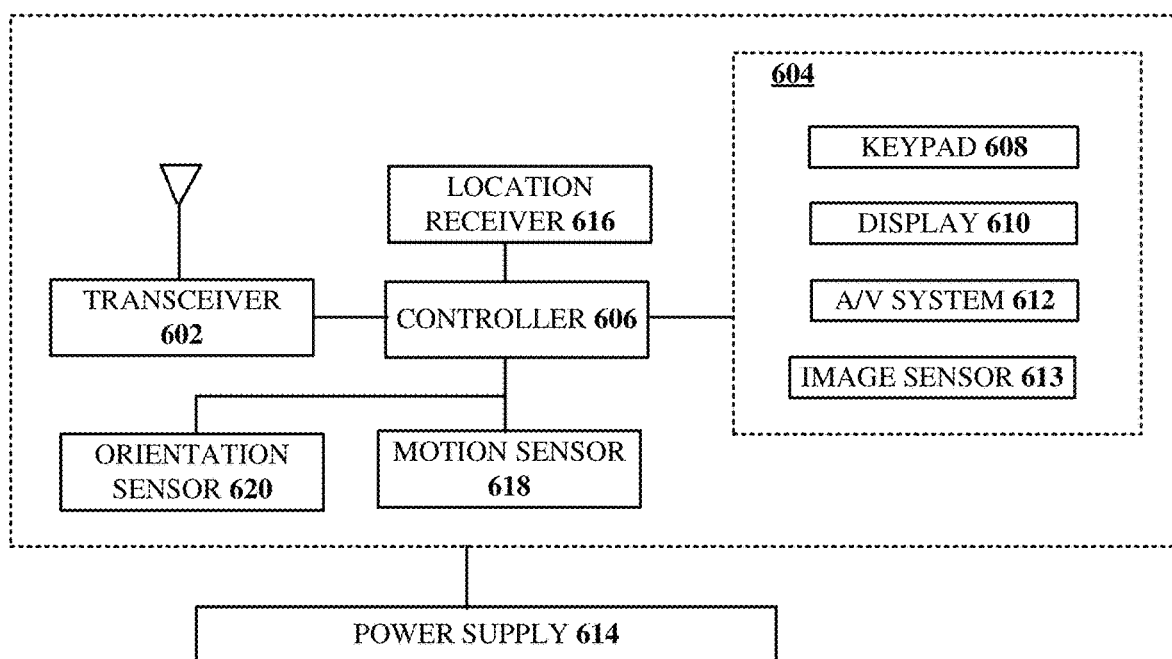
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part, an automated identification of a streaming-media KPI threshold that corresponds to a satisfactory end-user quality. The identification process may include associating a time series of KPI values with a CDN subsystem, such as a live streaming caching server, in which the KPI values correspond to a number of streaming media consumption devices served by the CDN subsystem. In at least some embodiments, the time series of KPI values may be obtained from a centralized KPI monitoring service. Alternatively or in addition, the KPI values may be estimated according to access logs obtained from the CDN subsystem. The KPI value estimation process may apply machine learning, e.g., training an AI module based on previously recorded training data. In at least some embodiments, the thresholds may be applied, e.g., in combination with CDN subsystem access log information, to identify anomalous conditions that may be attributable to the streaming-content caching servers 205 (FIG. 2A), and/or for identifying a growth requirement for content caching capacity.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive, or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM, or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically predicting KPI values to anticipate likely performance issues that would impact streaming media quality and to identify their most likely root causes) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that may be explicitly trained (e.g., via a generic training data) as well as implicitly trained (e.g., via observing CDN performance data in view of actual reported KPI values). For example, SVMs can be configured via a learning or training phase within a classifier constructor and feature selection module. Thus, the classifier(s) can be used to automatically learn and perform a number of functions, including but not limited to determining according to predetermined criteria, predictions of KPI values in real time or near real time, to anticipate likely performance issues that would impact streaming media quality and to facilitate identification of their most likely root causes.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches, and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature, or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:

calculating, by a processing system including a processor, a threshold value of a streaming-media key performance indicator (KPI) based on a level of certainty that a predetermined target portion of a plurality of end-user media processors provide an acceptable end-user experience;

obtaining, by the processing system, access records of a content delivery network (CDN) configured to serve media content requested by the plurality of end-user media processors, wherein the CDN includes at least one origin server and at least one streaming-content caching server;

predicting, by the processing system, a plurality of values of the streaming-media KPI according to the access records of the CDN, to obtain a plurality of predicted values of the streaming-media KPI;

comparing, by the processing system, the plurality of predicted values of the streaming-media KPI to the threshold value of the streaming-media KPI within a sequence of anomaly threshold time windows;

determining, by the processing system, that a threshold number of the plurality of predicted values of the streaming-media KPI exceed the threshold value of the streaming-media KPI in at least one of the anomaly threshold time windows indicating a need for capacity growth in the CDN; and identifying, by the processing system, an anomaly according to the determining, the anomaly indicating that the need for capacity growth is in one of the at least one origin server and the at least one streaming-content caching server.

2. The method of claim 1, wherein the calculating the threshold value of the streaming-media KPI further comprises:

accessing, by the processing system, a time series of actual streaming-media KPI values associated a serving of media content to the plurality of end-user media processors, wherein the calculating of the threshold value of the streaming-media KPI is further based on the time series of actual streaming-media KPI values.

3. The method of claim 2, wherein the threshold value of the streaming-media KPI comprises one of a maximum value, a minimum value, an average maximum value, an average minimum value, an average value or any combination thereof, of the time series of actual streaming-media KPI values reported for the plurality of end-user media processors.

4. The method of claim 1, wherein the predicting the plurality of values of the streaming-media KPI further comprises:

providing, by the processing system and to a neural network, training data comprising a training time-series of streaming-media KPI values and corresponding training access records of the CDN;

training, by the processing system, the neural network according to the training data to obtain a trained neural network; and providing, by the processing system, current access records of the CDN to the trained neural network, wherein the trained neural network, in response, determines the plurality of predicted values of the streaming-media KPI.

5. The method of claim 4, further comprising:

obtaining, by the processing system, the training time-series of streaming-media KPI values via a KPI monitoring service.

6. The method of claim 1, further comprising:

identifying, by the processing system, an alarm threshold value;

determining, by the processing system, a time-averaged, threshold value of the streaming-media KPI; and calculating, by the processing system, a difference value between the time-averaged, threshold value of the streaming-media KPI and the alarm threshold value, wherein the difference value provides an estimate of growth capacity.

7. The method of claim 1, wherein the streaming-media KPI comprise one of a media start time, a media playback stall rate, a media failure to start rate, an exit before media start rate, a media rebuffering ratio, or any combination thereof.

8. The method of claim 1, further comprising:

associating, by the processing system, access records of the CDN with the plurality of end-user media processors.

9. The method of claim 8, wherein the associating further comprises:

obtaining, by the processing system, one of a transaction identifier, a geolocation, or both, of an end-user media processor of the plurality of end-user media processors; and associating, by the processing system, the plurality of streaming-media KPI values with the end-user media processor according to the transaction identifier, the geolocation, or both.

10. The method of claim 1, wherein the identifying the anomaly comprises:

counting, by the processing system, plurality of predicted values of the streaming-media KPI that exceed the threshold value of the streaming-media KPI to obtain a sum;

comparing, by the processing system, the sum to an acceptable number limit to obtain a comparison result; and initiating, by the processing system, an alarm responsive to the comparison result indicating the sum exceeds the acceptable number limit.

11. A device, comprising:

a processing system including a processor; and a memory that stores executable instructions that, when executed by the processing system, facilitate performance of operations, the operations comprising:

determining a threshold value of a streaming-media key performance indicator (KPI) based on a predetermined target portion of a plurality of end-user devices providing an acceptable performance;

obtaining performance records of a content delivery network (CDN) adapted to cache and serve media content requested by the plurality of end-user devices, wherein the CDN includes at least one origin server and at least one streaming-content caching server;

predicting a plurality of values of the streaming-media KPI according to the performance records of the CDN, to obtain a plurality of predicted values of the streaming-media KPI;

comparing the plurality of predicted values of the streaming-media KPI to the threshold value of the streaming-media KPI within a sequence of anomaly threshold time windows;

determining, by the processing system, that a threshold number of the plurality of predicted values of the streaming-media KPI exceed the threshold value of the streaming-media KPI in at least one of the anomaly threshold time windows indicating a need for capacity growth in the CDN; and identifying an anomaly according to the determining, the anomaly indicating that the need for capacity growth is in one of the at least one origin server and the at least one streaming-content caching server.

12. The device of claim 11, wherein the determining the threshold value of the streaming-media KPI further comprises:

accessing a time series of actual streaming-media KPI values associated a serving of media content to the plurality of end-user devices, wherein determining the threshold value of the streaming-media KPI is further based on the time series of actual streaming-media KPI values.

13. The device of claim 12, wherein the threshold value of the streaming-media KPI comprises one of a maximum value, a minimum value, an average maximum value, an average minimum value, an average value, a median value, or any specified distribution value, or any combination thereof, of the time series of actual streaming-media KPI values reported for the plurality of end-user devices.

14. The device of claim 11, wherein the predicting the plurality of values of the streaming-media KPI further comprises:

providing, to a neural network, training data comprising a training time-series of streaming-media KPI values and a corresponding training access records of the CDN;

training the neural network according to the training data to obtain a trained neural network; and providing current access records of the CDN to the trained neural network, wherein the trained neural network, in response, determines the plurality of predicted values of the streaming-media KPI.

15. The device of claim 11, wherein the streaming-media KPI values comprise one of a media start time, a media playback stall rate, a media failure to start rate, an exit before media start rate, a media rebuffering ratio, or any combination thereof.

16. The device of claim 11, wherein the operations further comprise:

associating access records of the CDN with the plurality of end-user devices.

17. The device of claim 16, wherein the associating further comprises:

obtaining one of a transaction identifier, a geolocation, or both, of an end-user media processor of the plurality of end-user devices; and associating the plurality of streaming-media KPI values with the end-user media processor according to the one of the transaction identifier, the geolocation, or both.

18. A non-transitory, machine-readable medium, comprising executable instructions that, when executed by a processing system including a processor, facilitate performance of operations, the operations comprising:

identifying a threshold value of a streaming-media key performance indicator (KPI) based on a predetermined target portion of a plurality of end-user devices providing an acceptable performance;

obtaining performance records of a content delivery network (CDN) adapted to cache and serve media content requested by the plurality of end-user devices, wherein the CDN includes at least one origin server and at least one streaming-content caching server;

generating a plurality of predicted values of the streaming-media KPI according to the performance records of the CDN, to obtain a plurality of predicted values of the streaming-media KPI;

comparing the plurality of predicted values of the streaming-media KPI to the threshold value of the streaming-media KPI within a sequence of anomaly threshold time windows;

determining, by the processing system, that a threshold number of the plurality of predicted values of the streaming-media KPI exceed the threshold value of the streaming-media KPI in at least one of the anomaly threshold time windows indicating a need for capacity growth in the CDN; and detecting an anomaly according to the determining, wherein the anomaly indicates that the need for capacity growth is in one of the at least one origin server and the at least one streaming-content caching server.

19. The non-transitory, machine-readable medium of claim 18, wherein identifying the threshold value of the streaming-media KPI further comprises:

accessing a plurality of actual streaming-media KPI values associated a serving of media content to the plurality of end-user devices, wherein the identifying the threshold value of the streaming-media KPI is further based on the plurality of actual streaming-media KPI values.

20. The non-transitory, machine-readable medium of claim 19, wherein the threshold value of the streaming-media KPI comprises one of a maximum value, a minimum value, an average maximum value, an average minimum value, an average value, or any specified distribution value, or any combination thereof, of the plurality of actual streaming-media KPI values reported for the plurality of end-user devices.

* * * * *